United States Patent
Kamat et al.

(10) Patent No.: US 12,152,537 B2
(45) Date of Patent: *Nov. 26, 2024

(54) TURBOMACHINERY ENGINES WITH HIGH-SPEED LOW-PRESSURE TURBINES

(71) Applicant: General Electric Company, Schenectady, NY (US)

(72) Inventors: Pranav R. Kamat, Bengaluru (IN); Bhaskar Nanda Mondal, Bengaluru (IN); Jeffrey D. Clements, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,317

(22) Filed: Feb. 1, 2024

(65) Prior Publication Data
US 2024/0280057 A1    Aug. 22, 2024

Related U.S. Application Data

(63) Continuation of application No. 18/318,604, filed on May 16, 2023, now Pat. No. 12,012,901.

(30) Foreign Application Priority Data

Feb. 17, 2023   (IN) .............................. 202311010789

(51) Int. Cl.
*F02C 7/36*    (2006.01)
*F01D 1/26*    (2006.01)
(Continued)

(52) U.S. Cl.
CPC ................. *F02C 7/36* (2013.01); *F01D 1/26* (2013.01); *F02C 3/06* (2013.01); *F02K 3/06* (2013.01);
(Continued)

(58) Field of Classification Search
CPC ...... F02C 7/36; F02C 3/06; F01D 1/26; F02K 3/06; F02K 3/077
See application file for complete search history.

(56) References Cited

U.S. PATENT DOCUMENTS 9,157,366 B2    10/2015    Kupratis
9,816,442 B2 *    11/2017    Schwarz ................. F02C 3/107
(Continued)

FOREIGN PATENT DOCUMENTS

| | | |
|---|---|---|
| CN | 107013368 A | 2/2017 |
| DE | 102022133702 A1 | 3/2023 |
| EP | 3 751 121 A1 | 12/2020 |

OTHER PUBLICATIONS

Bridgeman, M. CR-168290: NASA/GE Energy Efficient Engine Low Pressure Turbine Scaled Test Vehicle Performance Report (Year: 1983).*

(Continued)

*Primary Examiner* — Topaz L. Elliott
(74) *Attorney, Agent, or Firm* — Klarquist Sparkman, LLP

(57) ABSTRACT

A turbomachinery engine includes a fan assembly, a low-pressure turbine, and a gearbox. The fan assembly includes a plurality of fan blades. The low-pressure turbine includes 3-5 rotating stages. The low-pressure turbine includes an area ratio equal to the annular exit area of an aft-most rotating stage of the low-pressure turbine divided by the annular exit area of a forward-most rotating stage of the low-pressure turbine. In some instances, the area ratio is within a range of 3.1-5.1.

20 Claims, 20 Drawing Sheets

(51) Int. Cl.
*F02C 3/06* (2006.01)
*F02K 3/06* (2006.01)
*F02K 3/077* (2006.01)

(52) U.S. Cl.
CPC ........ *F02K 3/077* (2013.01); *F05D 2220/325* (2013.01); *F05D 2260/4031* (2013.01)

(56) References Cited

U.S. PATENT DOCUMENTS

| | | | |
|---|---|---|---|
| 9,845,726 | B2 | 12/2017 | Suciu et al. |
| 10,240,526 | B2 | 3/2019 | Suciu et al. |
| 10,830,123 | B2 | 11/2020 | Homison et al. |
| 10,830,178 | B2 | 11/2020 | Blackwell et al. |
| 10,844,721 | B2 | 11/2020 | Townes et al. |
| 2006/0228206 | A1* | 10/2006 | Decker ............... F01D 5/141 415/1 |
| 2013/0192200 | A1 | 8/2013 | Kupratis et al. |
| 2015/0361878 | A1 | 12/2015 | Schwarz et al. |
| 2015/0377124 | A1 | 12/2015 | Adams et al. |
| 2016/0369703 | A1* | 12/2016 | Gallagher ............. F02C 7/36 |
| 2018/0080411 | A1 | 3/2018 | Miller et al. |
| 2018/0238186 | A1 | 8/2018 | Miller et al. |
| 2019/0309688 | A1 | 10/2019 | Stretton et al. |
| 2020/0141358 | A1 | 5/2020 | Cooper et al. |
| 2020/0290743 | A1* | 9/2020 | Armstrong ............ F02K 3/06 |
| 2020/0291782 | A1 | 9/2020 | Townes et al. |
| 2020/0392910 | A1 | 12/2020 | Whatley |
| 2021/0164392 | A1 | 6/2021 | Harvey |
| 2022/0042462 | A1 | 2/2022 | Molesini et al. |
| 2022/0074352 | A1 | 3/2022 | Adams et al. |
| 2023/0028763 | A1 | 1/2023 | Pixton et al. |
| 2024/0077047 | A1 | 3/2024 | Frowein et al. |
| 2024/0209747 | A1* | 6/2024 | Truebenbach ............ F02K 3/06 |

OTHER PUBLICATIONS

Cherry, D. CR-167956: Energy Efficient Engine Low Pressure Turbine Test Hardware Detailed Design Report (Year: 1983).*

Gray et al., "Energy Efficient Engine Program technology benefit/cost study, vol. 2", Oct. 1, 1983 (Oct. 1, 1983), XP055538754, United States, Retrieved from the Internet: URL: https://ntrs.nasa.gov/archive/nasa/casi.ntrs.nasa.gov/19900019249.pdf (pp. 31-34).

Gliebe et al., "Ultra-High Bypass Engine Aeroacoustic Study", NASA/CR-2003-212525, Oct. 1, 2003 (Oct. 1, 2003), XP055277347, Retrieved from the Internet: URL: http://ntrs.nasa.gov/archive/nasa/casi.ntrs.nasa.gov/20040000741.pdf [retrieved on Jun. 2, 2016] (p. 43).

Bridgeman et al., "NASA/GE Energy Efficient Engine low pressure turbine scaled test vehicle performance report," NASA CR-168290, Jul. 1, 1983 (Jul. 1, 1983), United States, Retrieved from the Internet: URL: https://ntrs.nasa.gov/citations/19900019247/downloads/00019247.pdf.

Cherry et al., "Energy efficient engine. Low pressure turbine test hardware detailed design report," NASA CR-167956, Aug. 1, 1982 (Aug. 1, 1982) United States, Retrieved from the Internet: URL: https://ntrs.nasa.gov/citations/19850002686/downloads/19850002686.pdf.

* cited by examiner

| | LPT STAGES (N) | GEAR RATIO | EGT @ R/L (°C) | STG1 EXIT AREA (IN²) | STG2 EXIT AREA (IN²) | STG3 EXIT AREA (IN²) | AREA RATIO | AREA-EGT RATIO | STG1 AN² @R/L | STG3 AN² @R/L |
|---|---|---|---|---|---|---|---|---|---|---|
| ENGINE 01 | 3 | 2.95 | 1083 | 326.7 | 527.3 | 727.8 | 2.23 | 1.38 | 35 | 79 |
| ENGINE 02 | 3 | 2.95 | 1083 | 326.7 | 527.3 | 727.8 | 2.23 | 1.38 | 35 | 79 |
| ENGINE 03 | 3 | 3.14 | 1083 | 285.0 | 461.8 | 638.5 | 2.24 | 1.38 | 35 | 79 |
| ENGINE 04 | 3 | 3.40 | 1083 | 326.7 | 526.0 | 725.3 | 2.22 | 1.38 | 36 | 79 |
| ENGINE 05 | 3 | 3.40 | 1083 | 326.7 | 576.9 | 827.0 | 2.53 | 1.47 | 36 | 90 |
| ENGINE 06 | 3 | 3.40 | 1083 | 326.7 | 638.8 | 950.9 | 2.91 | 1.58 | 36 | 104 |
| ENGINE 07 | 3 | 3.06 | 1083 | 372.4 | 699.5 | 1026.5 | 2.76 | 1.53 | 33 | 91 |
| ENGINE 08 | 3 | 2.84 | 1100 | 316.1 | 490.8 | 773.5 | 2.45 | 1.42 | 32 | 79 |
| ENGINE 09 | 3 | 8.33 | 1067 | 293.2 | 467.0 | 764.9 | 2.61 | 1.51 | 30 | 80 |

FIG. 9

| | LPT STAGES (N) | GEAR RATIO | EGT @ R/L (°C) | STG1 EXIT AREA (IN²) | STG2 EXIT AREA (IN²) | STG3 EXIT AREA (IN²) | STG4 EXIT AREA (IN²) | AREA RATIO | AREA-EGT RATIO | STG1 AN² @R/L | STG4 AN² @R/L |
|---|---|---|---|---|---|---|---|---|---|---|---|
| ENGINE 10 | 4 | 3.10 | 1080 | 242.5 | 380.1 | 626.4 | 761.4 | 3.14 | 1.36 | 20 | 64 |
| ENGINE 11 | 4 | 3.10 | 1080 | 261.7 | 409.9 | 615.8 | 821.8 | 3.14 | 1.36 | 21 | 65 |
| ENGINE 12 | 4 | 3.10 | 1080 | 261.7 | 423.9 | 725.1 | 949.2 | 3.63 | 1.42 | 21 | 75 |
| ENGINE 13 | 4 | 3.10 | 1080 | 261.7 | 506.1 | 786.5 | 1066.8 | 4.08 | 1.48 | 21 | 84 |
| ENGINE 14 | 4 | 3.10 | 1080 | 261.7 | 516.4 | 850.8 | 1185.1 | 4.53 | 1.53 | 21 | 94 |
| ENGINE 15 | 4 | 2.79 | 1080 | 257.6 | 505.8 | 835.2 | 1164.5 | 4.52 | 1.53 | 17 | 75 |
| ENGINE 16 | 4 | 2.33 | 1080 | 299.2 | 442.1 | 618.3 | 998.1 | 3.34 | 1.38 | 13 | 44 |
| ENGINE 17 | 4 | 8.70 | 1175 | 171.9 | 275.0 | 496.9 | 632.0 | 3.68 | 1.31 | 18 | 65 |
| ENGINE 18 | 4 | 8.70 | 1175 | 171.9 | 275.0 | 530.2 | 778.5 | 4.53 | 1.41 | 18 | 80 |
| ENGINE 19 | 4 | 8.70 | 1175 | 191.0 | 284.4 | 557.0 | 875.4 | 5.09 | 1.46 | 18 | 90 |
| ENGINE 20 | 4 | 8.70 | 1175 | 191.0 | 337.7 | 629.8 | 972.8 | 5.09 | 1.46 | 14 | 74 |
| ENGINE 21 | 4 | 7.83 | 1175 | 212.2 | 352.8 | 578.7 | 884.8 | 4.17 | 1.37 | 18 | 76 |
| ENGINE 22 | 4 | 7.83 | 1175 | 222.4 | 350.7 | 612.1 | 907.7 | 4.08 | 1.36 | 20 | 80 |
| ENGINE 23 | 4 | 7.83 | 1175 | 232.2 | 351.1 | 651.2 | 960.2 | 4.14 | 1.37 | 19 | 80 |
| ENGINE 24 | 4 | 8.70 | 1175 | 171.9 | 275.0 | 496.9 | 632.0 | 3.68 | 1.31 | 17 | 61 |
| ENGINE 25 | 4 | 7.91 | 1175 | 193.7 | 306.7 | 551.5 | 893.0 | 4.61 | 1.42 | 19 | 86 |
| ENGINE 26 | 4 | 8.33 | 1175 | 175.6 | 290.5 | 505.1 | 864.6 | 4.92 | 1.45 | 15 | 76 |
| ENGINE 27 | 4 | 8.33 | 1067 | 237.3 | 379.8 | 554.1 | 804.4 | 3.39 | 1.41 | 17 | 57 |
| ENGINE 28 | 4 | 6.96 | 1067 | 283.0 | 402.3 | 566.0 | 867.0 | 3.06 | 1.36 | 21 | 65 |
| ENGINE 29 | 4 | 8.70 | 1175 | 171.9 | 275.0 | 496.9 | 632.0 | 3.68 | 1.31 | 16 | 58 |
| ENGINE 30 | 4 | 6.96 | 1175 | 244.4 | 319.7 | 502.9 | 886.0 | 3.63 | 1.31 | 16 | 58 |
| ENGINE 31 | 4 | 8.33 | 1175 | 175.6 | 290.5 | 505.1 | 864.6 | 4.92 | 1.45 | 17 | 86 |
| ENGINE 32 | 4 | 8.33 | 1067 | 239.7 | 397.7 | 596.2 | 891.0 | 3.72 | 1.45 | 24 | 88 |

FIG. 12

| | LPT STAGES (N) | GEAR RATIO | EGT @ R/L (°C) | STG1 EXIT AREA (IN²) | STG2 EXIT AREA (IN²) | STG3 EXIT AREA (IN²) | STG4 EXIT AREA (IN²) | STG5 EXIT AREA (IN²) | AREA RATIO | AREA-EGT RATIO | STG1 AN² @R/L | STG5 AN² @R/L |
|---|---|---|---|---|---|---|---|---|---|---|---|---|
| ENGINE 33 | 5 | 6.96 | 1175 | 212.1 | 341.6 | 524.5 | 875.0 | 1212.0 | 5.72 | 1.32 | 15 | 84 |
| ENGINE 34 | 5 | 6.96 | 1175 | 220.4 | 331.0 | 508.8 | 874.6 | 1210.0 | 5.49 | 1.30 | 12 | 65 |
| ENGINE 35 | 5 | 7.40 | 1175 | 180.5 | 256.9 | 508.7 | 816.6 | 1161.0 | 6.43 | 1.36 | 9 | 59 |
| ENGINE 36 | 5 | 6.96 | 1175 | 232.6 | 326.9 | 527.7 | 895.0 | 1279.3 | 5.50 | 1.30 | 14 | 76 |
| ENGINE 37 | 5 | 7.56 | 1175 | 155.4 | 250.2 | 379.3 | 563.1 | 851.4 | 5.48 | 1.30 | 14 | 76 |

FIG. 15

TURBOMACHINERY ENGINES WITH HIGH-SPEED LOW-PRESSURE TURBINES

CROSS REFERENCE TO RELATED APPLICATIONS

This application is a continuation of U.S. patent application Ser. No. 18/318,604, filed May 16, 2023, which claims the benefit of Indian patent application Ser. No. 20/2311010789, filed Feb. 17, 2023. The prior applications are incorporated by reference herein.

FIELD

This disclosure relates generally to turbomachinery engines comprising a gearbox and particularly to geared turbofan engines.

BACKGROUND

A turbofan engine is a type of turbomachinery engine and includes a core engine that drives a bypass fan. The bypass fan generates the majority of the thrust of the turbofan engine. The generated thrust can be used to move a payload (e.g., an aircraft).

In some instances, a turbofan engine is configured as a direct drive engine. Direct drive engines are configured such that a power turbine (e.g., a low-pressure turbine) of the core engine is directly coupled to the bypass fan. As such, the power turbine and the bypass fan rotate at the same rotational speed (i.e., the same rpm).

In other instances, a turbofan engine can be configured as a geared engine. Geared engines include a gearbox disposed between and interconnecting the bypass fan and power turbine of the core engine. The gearbox, for example, allows the power turbine of the core engine to rotate at a different speed than the bypass fan. Thus, the gearbox can, for example, allow the power turbine of the core engine and the bypass fan to operate at their respective rotational speeds for improved efficiency and/or power production.

There is an ongoing need for improved engine configurations for geared turbofan engines.

BRIEF DESCRIPTION OF THE DRAWINGS

FIG. 9 is a chart depicting various engine parameters of several exemplary turbomachinery engines comprising three rotating blade stages, according to the present disclosure.

FIG. 12 is a chart depicting various engine parameters of several exemplary turbomachinery engines comprising four rotating blade stages, according to the present disclosure.

FIG. 15 is a chart depicting various engine parameters of several exemplary turbomachinery engines comprising five rotating blade stages, according to the present disclosure.

DETAILED DESCRIPTION

Figure 1:
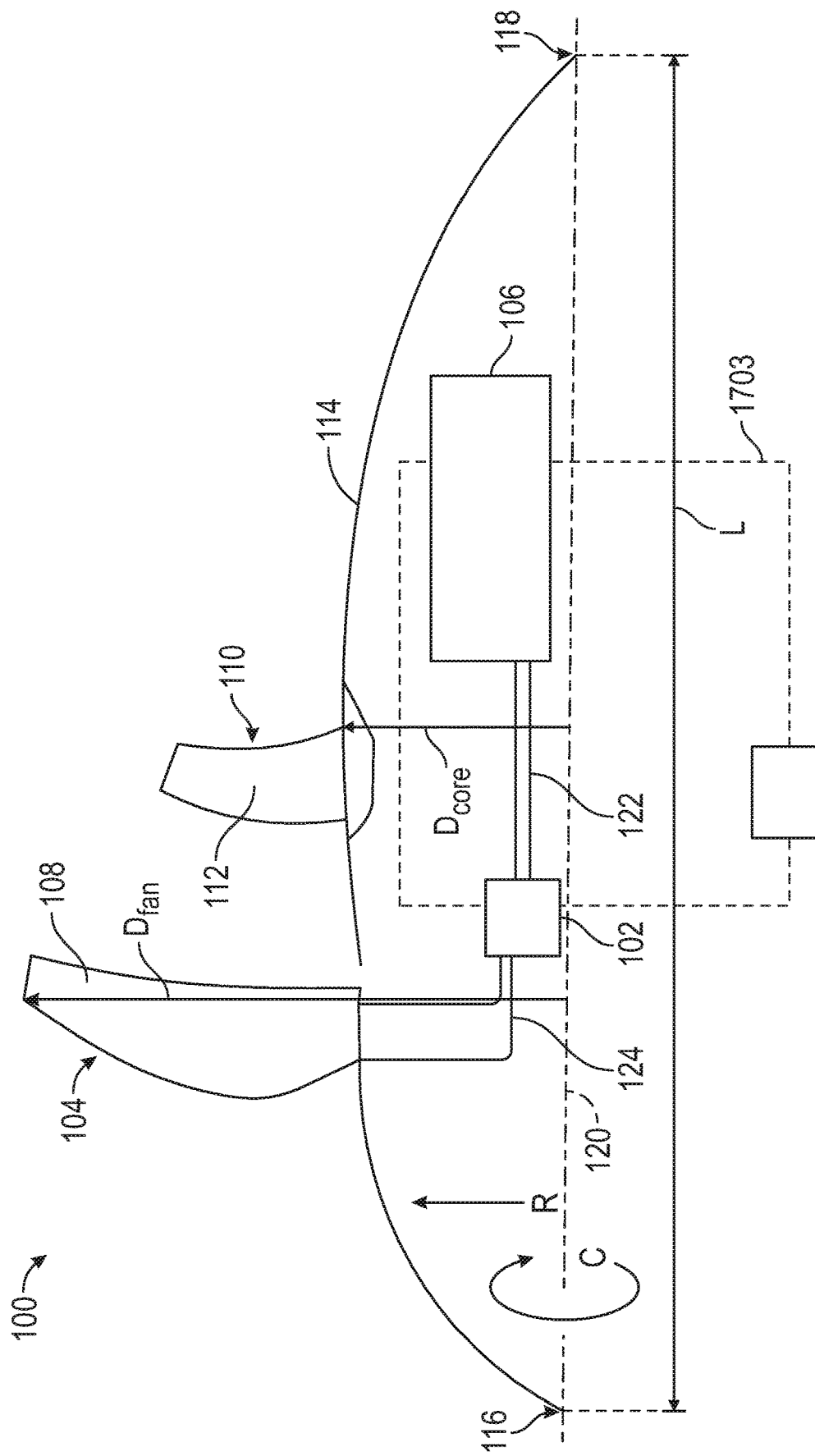
FIG. 1 is a cross-sectional schematic illustration of an example of a turbomachinery engine configured with an open rotor propulsion system, according to the present disclosure.

Reference now will be made in detail to examples of the disclosed technology, one or more examples of which are illustrated in the drawings. Each example is provided by way of explanation of the disclosed technology, not a limitation of the disclosure. In fact, it will be apparent to those skilled in the art that various modifications and variations can be made in the present disclosure without departing from the scope or spirit of the disclosure. For instance, features illustrated or described as part of one example can be used with another example to yield a still further example. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify the location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachinery engine or gear assembly described herein below may be manufactured or formed using any suitable process, such as an additive manufacturing process, such as a 3-D printing process. The use of such a process may allow such components to be formed integrally, as a single monolithic component, or as any suitable number of sub-components. In particular, the additive manufacturing process may allow such components to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

Rising fuel prices, depleting natural resources, and regulatory constraints place increasing demands on turbomachinery engines. As such, turbomachinery engines with improved efficiency and performance are desired. Designing turbomachinery engines, however, is complex, time consuming, and expensive. There are many engine components and parameters to consider (each of various weight), and many are of the components and parameters are interdependent. Therefore, changing one component or one parameter can often create cascading effects requiring one or more other parameters or components to be reconfigured.

Various turbomachinery engines and gear assemblies are disclosed herein. The disclosed turbomachinery engines have improved efficiency and/or performance than typical turbomachinery engines.

The disclosed turbomachinery engines comprise a gearbox and a turbine (e.g., a low-pressure turbine) coupled to the gearbox. The disclosed turbomachinery engines are characterized or defined by one or more parameters of a turbine (e.g., the low-pressure turbine). These turbine parameters include: an area ratio and/or an area-EGT ratio. Additional information about these ratios and exemplary engines comprising these ratios are provided below.

Referring now to the drawings, FIG. 1 is an example of an engine 100 including a gear assembly 102 according to aspects of the present disclosure. The engine 100 includes a fan assembly 104 driven by a core engine 106. In various examples, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 extends from the outer casing 114 in a cantilevered manner. Thus, the vane assembly 110 can also be referred to as an unducted vane assembly. The vane assembly 110, including a plurality of vanes 112, is positioned in operable arrangement with the fan blades 108 to provide thrust, control thrust vector, abate or re-direct undesired acoustic noise, and/or otherwise desirably alter a flow of air relative to the fan blades 108.

In some examples, the fan assembly 104 includes eight (8) to twenty-two (22) fan blades 108. In particular examples, the fan assembly 104 includes ten (10) to eighteen (18) fan blades 108. In certain examples, the fan assembly 104 includes twelve (12) to sixteen (16) fan blades 108. In some examples, the vane assembly 110 includes three (3) to thirty (30) vanes 112. In certain examples, the vane assembly 110 includes an equal or fewer quantity of vanes 112 to fan blades 108. For example, in particular examples, the engine 100 includes twelve (12) fan blades 108 and ten (10) vanes 112. In other examples, the vane assembly 110 includes a greater quantity of vanes 112 to fan blades 108. For example, in particular implementations, the engine 100 includes ten (10) fan blades 108 and twenty-three (23) vanes 112.

In certain examples, such as depicted in FIG. 1, the vane assembly 110 is positioned downstream or aft of the fan assembly 104. However, it should be appreciated that in some examples, the vane assembly 110 may be positioned upstream or forward of the fan assembly 104. In still various examples, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

In certain examples, such as depicted in FIG. 1, the engine 100 is an un-ducted thrust producing system, such that the plurality of fan blades 108 is unshrouded by a nacelle or fan casing. As such, in various examples, the engine 100 may be configured as an unshrouded turbofan engine, an open rotor engine, or a propfan engine. In particular examples, the engine 100 is an unducted rotor engine with a single row of fan blades 108. The fan blades 108 can have a large diameter, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds.

The fan blades 108 comprise a diameter ($D_{fan}$). It should be noted that for purposes of illustration only half of the Dan is shown (i.e., the radius of the fan). In some examples, the $D_{fan}$ is 72-216 inches. In particular examples the $D_{fan}$ is 100-200 inches. In certain examples, the $D_{fan}$ is 120-190 inches. In other examples, the $D_{fan}$ is 72-120 inches. In yet other examples, the $D_{fan}$ is 50-80 inches.

In some examples, the fan blade tip speed at a cruise flight condition can be 650 to 1000 fps, or 800 to 900 fps. A fan pressure ratio (FPR) for the fan assembly 104 can be 1.04 to 1.10, or in some examples 1.05 to 1.08, as measured across the fan blades at a cruise flight condition. In other examples, the FPR can be within a range of 1.04-1.8, 1.1-1.4, 1.3-1.6, or 1.5-1.8.

Cruise altitude is generally an altitude at which an aircraft levels after climb and prior to descending to an approach flight phase. In various examples, the engine is applied to a vehicle with a cruise altitude up to approximately 65,000 ft. In certain examples, cruise altitude is from approximately 28,000 ft. to approximately 45,000 ft. In still certain examples, cruise altitude is expressed in flight levels (FL) based on standard air pressure at sea level, in which a cruise flight condition is from FL280 to FL650. In another example, cruise flight condition is from FL280 to FL450. In still certain examples, cruise altitude is defined based at least on barometric pressure, in which cruise altitude is from approximately 4.85 psia to approximately 0.82 psia based on a sea-level pressure of approximately 14.70 psia and sea-level temperature at approximately 59 degrees Fahrenheit. In another example, cruise altitude is from approximately 4.85 psia to approximately 2.14 psia. It should be appreciated that in certain examples, the ranges of cruise altitude defined by pressure may be adjusted based on a different reference sea-level pressure and/or sea-level temperature.

The core engine 106 is generally encased in outer casing 114 defining one-half of a core diameter ($D_{core}$), which may be thought of as the maximum extent from the centerline axis (datum for R). In certain examples, the engine 100 includes a length (L) from a longitudinally (or axial) forward end 116 to a longitudinally aft end 118. In various examples, the engine 100 defines a ratio of $L/D_{core}$ that provides for reduced installed drag. In one example, $L/D_{core}$ is at least 2. In another example, $L/D_{core}$ is at least 2.5. In some examples, the $L/D_{core}$ is less than 5, less than 4, and less than 3. In various examples, it should be appreciated that the $L/D_{core}$ is for a single unducted rotor engine.

The reduced installed drag may further provide for improved efficiency, such as improved specific fuel consumption. Additionally, or alternatively, the reduced installed drag may provide for cruise altitude engine and aircraft operation at or above Mach 0.5. In certain examples, the $L/D_{core}$, the fan assembly 104, and/or the vane assembly 110 separately or together configure, at least in part, the engine 100 to operate at a maximum cruise altitude operating speed from approximately Mach 0.55 to approximately Mach 0.85; or from approximately Mach 0.72 to Mach 0.85 or from approximately Mach 0.75 to Mach 0.85.

Referring still to FIG. 1, the core engine 106 extends in a radial direction (R) relative to an engine centerline axis 120. The gear assembly 102 receives power or torque from the core engine 106 through a power input source 122 and provides power or torque to drive the fan assembly 104, in a circumferential direction C about the engine centerline axis 120, through a power output source 124.

The gear assembly 102 of the engine 100 can include a plurality of gears, including an input and an output. The gear assembly 102 can also include one or more intermediate gears disposed between and/or interconnecting the input and the output. The input can be coupled to a turbine section of the core engine 106 and can comprise a first rotational speed. The output can be coupled to the fan assembly 104 and can have a second rotational speed. In some examples, a gear ratio of the first rotational speed to the second rotational speed is less than or equal to four (e.g., within a range of 2.0-4.0). In other examples, a gear ratio of the first rotational speed to the second rotational speed is greater than four (e.g., within a range of 4.1-14.0).

The gear assembly 102 (which can also be referred to as "a gearbox") can comprise various types and/or configurations. For example, in some instances, the gearbox is an epicyclic gearbox configured in a star gear configuration. Star gear configurations comprise a sun gear, a plurality of star gears (which can also be referred to as "planet gears"), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the gearbox is an epicyclic gearbox configured in a planet gear configuration. Planet gear configurations comprise a sun gear, a plurality of planet gears, and a ring gear. The sun gear is the input and is coupled to the power turbine. The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Figure 10:
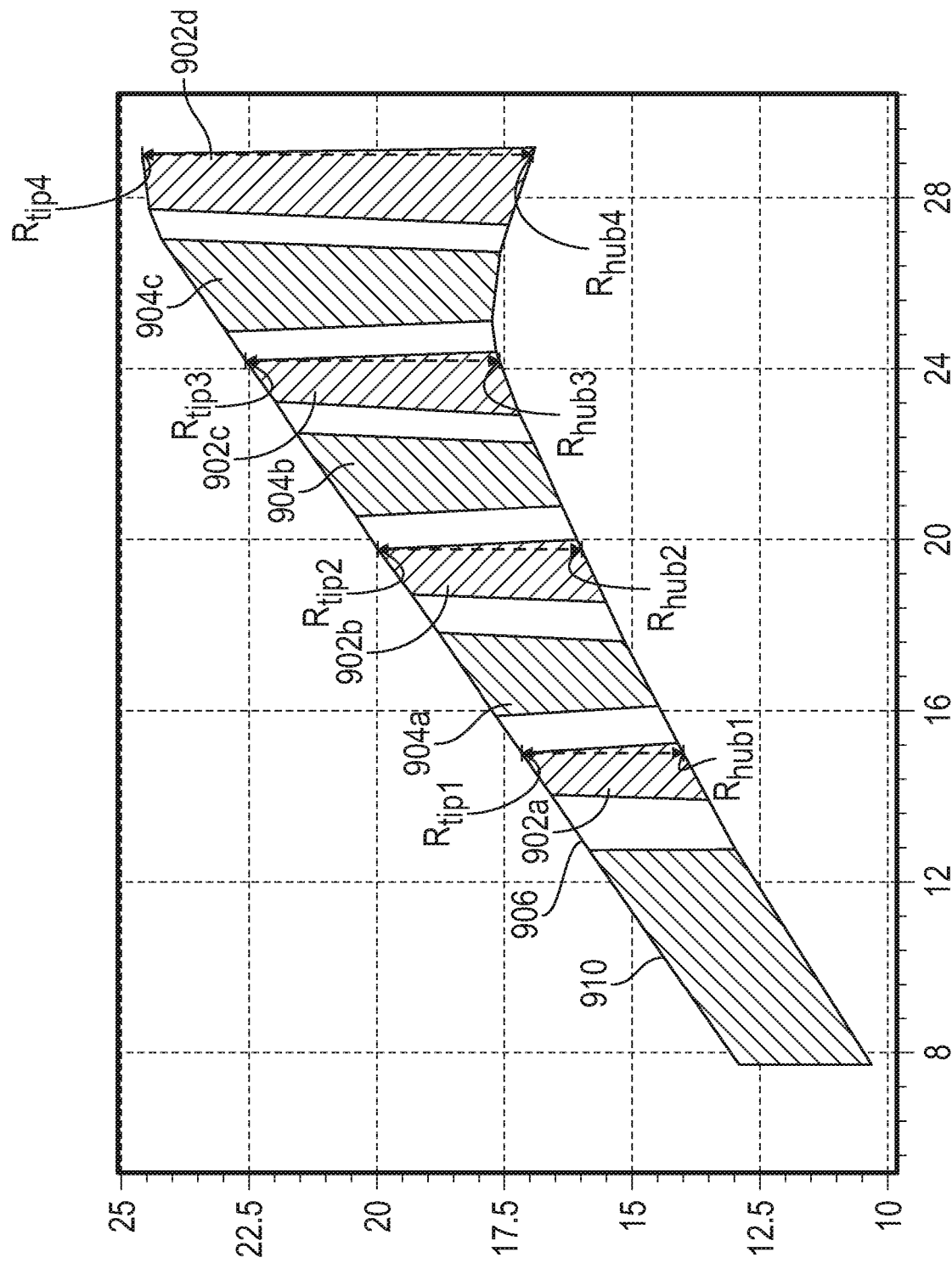
FIG. 10 is a cross-sectional schematic illustration of an example of a low-pressure turbine comprising four rotating blade stages, according to the present disclosure.
Figure 11:
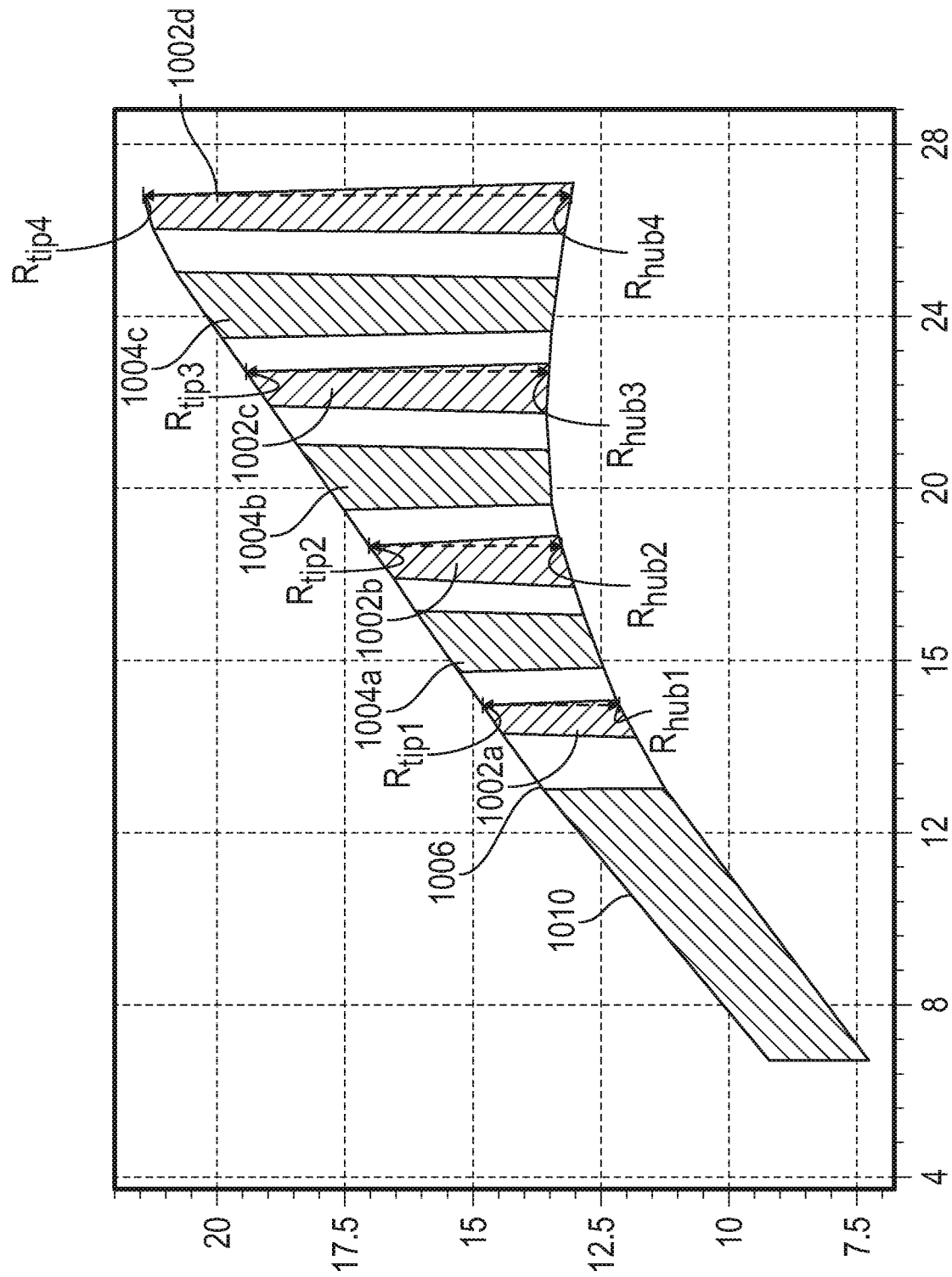
FIG. 11 is a cross-sectional schematic illustration of another example of a low-pressure turbine comprising four rotating blade stages, according to the present disclosure.

In some examples, the gearbox is a single-stage gearbox (e.g., FIGS. 10-11). In other examples, the gearbox is a multi-stage gearbox (e.g., FIGS. 9 and 12). In some examples, the gearbox is an epicyclic gearbox. In some examples, the gearbox is a non-epicyclic gearbox (e.g., a compound gearbox-FIG. 13).

As noted above, the gear assembly can be used to reduce the rotational speed of the output relative to the input. In some examples, a gear ratio of the input rotational speed to the output rotational speed is within a range of 2-4. For example, the gear ratio can be 2-2.9, 3.2-4, or 3.25-3.75). In some examples, a gear ratio of the input rotational speed to the output rotational speed is greater than 4.1. For example, in particular instances, the gear ratio is within a range of 4.1-14.0, within a range of 4.5-14.0, or within a range of 6.0-14.0. In certain examples, the gear ratio is within a range of 4.5-12 or within a range of 6.0-11.0. As such, in some examples, the fan assembly can be configured to rotate at a rotational speed of 800-1500 rpm at a cruise flight condition, while the power turbine (e.g., the low-pressure turbine) is configured to rotate at a rotational speed of 2,500-15,000 rpm at a cruise flight condition. In particular examples, the fan assembly can be configured to rotate at a rotational speed of 850-1350 rpm at a cruise flight condition, while the power turbine is configured to rotate at a rotational speed of 5,000-10,000 rpm at a cruise flight condition.

Various gear assembly configurations are depicted schematically in FIGS. 9-13. These gearboxes can be used with any of the engines disclosed herein, including the engine 100. Additional details regarding the gearboxes are provided below.

Figure 2:
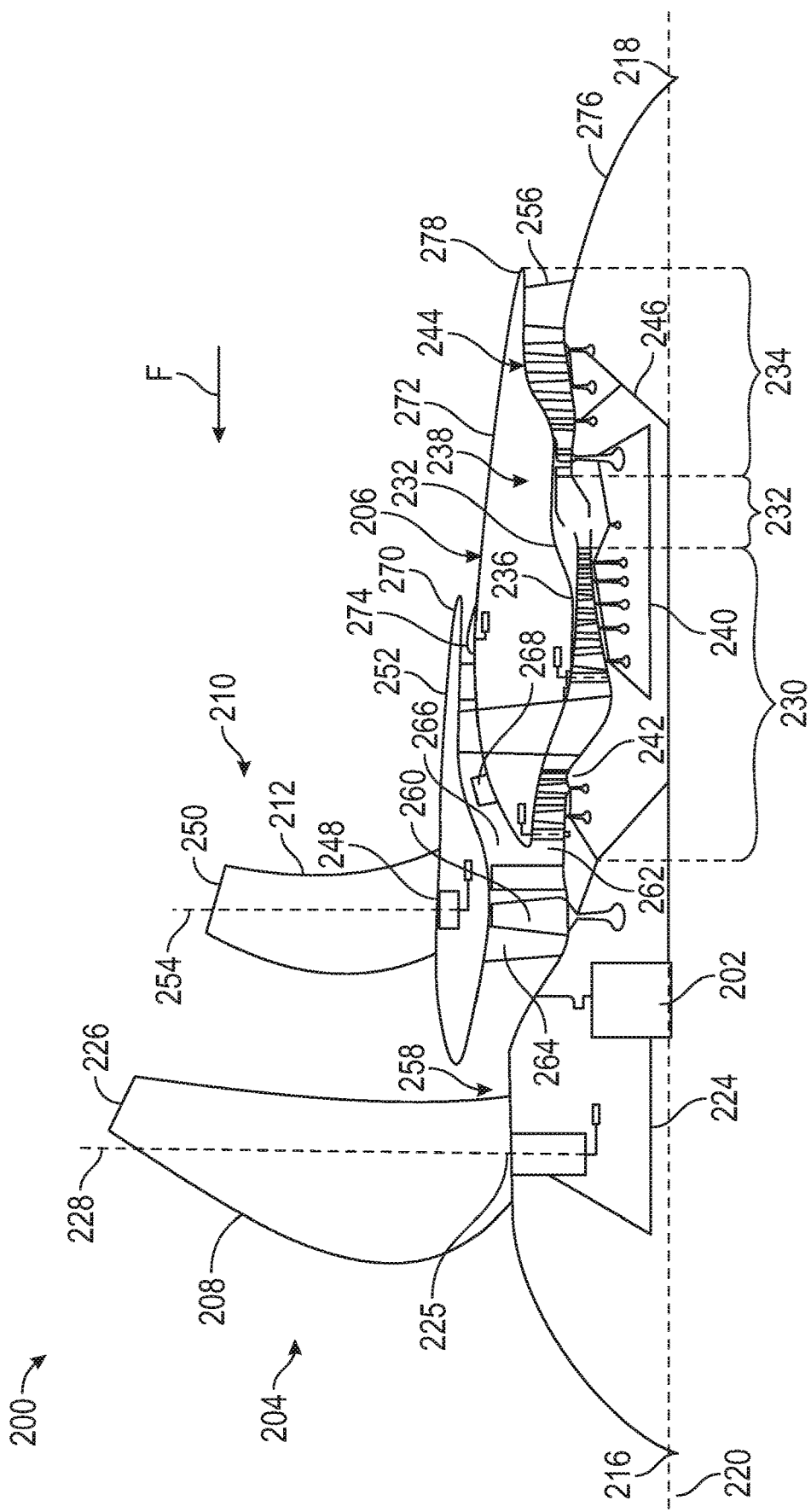
FIG. 2 is a cross-sectional schematic illustration of an example of a turbomachinery engine configured with an open rotor propulsion system, according to the present disclosure.

FIG. 2 shows a cross-sectional view of an engine 200, which is configured as an example of an open rotor propulsion engine. The engine 200 is generally similar to the engine 100, therefore, like parts will be identified with like numerals increased to the 200 series, with it being understood that the description of the like parts of the engine 100 applies to the engine 200 unless otherwise noted. For example, the gear assembly of the engine 100 is numbered "102" and the gear assembly of the engine 200 is numbered "202," and so forth. In addition to the gear assembly 202, the engine 200 comprises a fan assembly 204 that includes a plurality of fan blades 208 distributed around the engine centerline axis 220. Fan blades 208 are circumferentially arranged in an equally spaced relation around the engine centerline axis 220, and each fan blade 208 has a root 225 and a tip 226, and an axial span defined therebetween, as well as a central blade axis 228.

The core engine 206 includes a compressor section 230, a combustion section 232, and a turbine section 234 (which may be referred to as "an expansion section") together in a serial flow arrangement. The core engine 206 extends circumferentially relative to an engine centerline axis 220. The core engine 206 includes a high-speed spool that includes a high-pressure compressor 236 and a high-speed turbine 238 operably rotatably coupled together by a high-speed shaft 240. The combustion section 232 is positioned between the high-pressure compressor 236 and the high-pressure turbine 238.

The combustion section 232 may be configured as a deflagrative combustion section, a rotating detonation combustion section, a pulse detonation combustion section, and/or other appropriate heat addition system. The combustion section 232 may be configured as one or more of a rich-burn system or a lean-burn system, or combinations thereof. In still various examples, the combustion section 232 includes an annular combustor, a can combustor, a cannular combustor, a trapped vortex combustor (TVC), or another appropriate combustion system, or combinations thereof.

The core engine 206 also includes a booster or low-pressure compressor 242 positioned in flow relationship with the high-pressure compressor 236. The low-pressure compressor 242 is rotatably coupled with the low-pressure turbine 244 via a low-speed shaft 246 to enable the low-pressure turbine 244 to drive the low-pressure compressor 242. The low-speed shaft 246 is also operably connected to the gear assembly 202 to provide power to the fan assembly 204, such as described further herein.

It should be appreciated that the terms "low" and "high," or their respective comparative degrees (e.g., "lower" and "higher", where applicable), when used with compressor, turbine, shaft, or spool components, each refer to relative pressures and/or relative speeds within an engine unless otherwise specified. For example, a "low spool" or "low-speed shaft" defines a component configured to operate at a rotational speed, such as a maximum allowable rotational speed, lower than a "high spool" or "high-speed shaft" of the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed compressor within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

The compressors and/or turbines disclosed herein can include various stage counts. As disclosed herein the stage count includes the number of rotors or blade stages in a particular component (e.g., a compressor or turbine). For example, in some instances, a low-pressure compressor (which can also be referred to as "a booster") can comprise 1-8 stages, a high-pressure compressor can comprise 8-15 stages, a high-pressure turbine comprises 1-2 stages, and/or a low-pressure turbine comprises 3-7 stages (including exactly 3, 4, or 5 stages). For example, in certain examples, an engine can comprise a one stage low-pressure compressor, an 11 stage high-pressure compressor, a two stage high-pressure turbine, and a 7 stage low-pressure turbine. As another example, an engine can comprise a three stage low-pressure compressor, a 10 stage high-pressure compressor, a two stage high-pressure turbine, and a 7 stage low-pressure turbine. As another example, an engine can comprise a three stage low-pressure compressor, a 10 stage high-pressure compressor, a two stage high-pressure turbine, and a three stage low-pressure turbine. As another example, an engine can comprise a four stage low-pressure compressor, a 10 stage high-pressure compressor, a one stage high-pressure turbine, and a three stage low-pressure turbine. As another example, an engine can comprise a three stage low-pressure compressor, a 10 stage high-pressure compressor, a two stage high-pressure turbine, and a four stage low-pressure turbine. As another example, an engine can comprise a four stage low-pressure compressor, a 10 stage high-pressure compressor, a one stage high-pressure turbine, and a four stage low-pressure turbine. In other examples, an engine can comprise a 1-3 stage low-pressure compressor, an 8-11 stage high-pressure compressor, a 1-2 stage high-pressure turbine, and a 3-5 stage low-pressure turbine. In some examples, an engine can be configured without a low-pressure compressor.

In some examples, a low-pressure turbine is a counter-rotating low-pressure turbine comprising inner blade stages and outer blade stages. The inner blade stages extend radially outwardly from an inner shaft, and the outer blade stages extend radially inwardly from an outer drum. In particular examples, the counter-rotating low-pressure turbine comprises three inner blade stages and three outer blade stages, which can collectively be referred to as a six stage low-pressure turbine. In other examples, the counter-rotating low-pressure turbine comprises four inner blade stages and three outer blade stages, which can collectively be referred to as a seven stage low-pressure turbine.

As discussed in more detail below, the core engine 206 includes the gear assembly 202 that is configured to transfer power from the turbine section 234 and reduce an output rotational speed at the fan assembly 204 relative to the low-pressure turbine 244. Examples of the gear assembly 202 depicted and described herein can allow for gear ratios suitable for large diameter unducted fans (e.g., gear ratios of 4.1-14.0, 4.5-14.0, and/or 6.0-14.0). Additionally, examples of the gear assembly 202 provided herein may be suitable within the radial or diametrical constraints of the core engine 206 within an engine core cowl 272.

Various gearbox configurations are depicted schematically in FIGS. 16-19. These gearboxes can be used in any of the engines disclosed herein, including the engine 200. Additional details regarding the gearboxes are provided below.

Engine 200 also includes a vane assembly 210 comprising a plurality of vanes 212 disposed around engine centerline axis 220. Each vane 212 has a root 248 and a tip 250, and a span defined therebetween. Vanes 212 can be arranged in a variety of manners. In some examples, they are not all equidistant from the rotating assembly.

In some examples, vanes 212 are mounted to a stationary frame and do not rotate relative to the engine centerline axis 220 but may include a mechanism for adjusting their orientation relative to their axis 254 and/or relative to the fan blades 208. For reference purposes, FIG. 2 depicts a forward direction denoted with arrow F, which in turn defines the forward and aft portions of the system.

As depicted in FIG. 2, the fan assembly 204 is located forward of the core engine 106 with the exhaust 256 located aft of core engine 206 in a "puller" configuration. Other configurations are possible and contemplated as within the scope of the present disclosure, such as what may be termed a "pusher" configuration where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Left- or right-handed engine configurations, useful for certain installations in reducing the impact of multi-engine torque upon an aircraft, can be achieved by mirroring the airfoils (e.g., 208, 212) such that the fan assembly 204 rotates clockwise for one propulsion system and counter-clockwise for the other propulsion system. Alternatively, an optional reversing gearbox can be provided to permit a common gas turbine core and low-pressure turbine to be used to rotate the fan blades either clockwise or counter-clockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

The engine 200 also includes the gear assembly 202 which includes a gear set for decreasing the rotational speed of the fan assembly 204 relative to the low-pressure turbine 244. In operation, the rotating fan blades 208 are driven by the low-pressure turbine 244 via gear assembly 202 such that the fan blades 208 rotate around the engine centerline axis 220 and generate thrust to propel the engine 200, and hence an aircraft on which it is mounted, in the forward direction F.

In some examples, a gear ratio of the input rotational speed to the output rotational speed is greater than or equal to 4.1. In particular examples, the gear ratio is within a range of 4.1-14.0, within a range of 4.5-14.0, or within a range of 6.0-14.0. In certain examples, the gear ratio is within a range of 4.5-12 or within a range of 6.0-11.0. As such, in some examples, the fan assembly can be configured to rotate at a rotational speed of 800-1500 rpm at a cruise flight condition, while the power turbine (e.g., the low-pressure turbine) is configured to rotate at a rotational speed of 5,000-10,000 rpm at a cruise flight condition. In particular examples, the fan assembly can be configured to rotate at a rotational speed of 850-1350 rpm at a cruise flight condition, while the power turbine is configured to rotate at a rotational speed of 5,500-9,500 rpm a cruise flight condition.

It may be desirable that either or both of the fan blades 208 or the vanes 212 incorporate a pitch change mechanism such that the blades can be rotated with respect to an axis of pitch rotation (annotated as 228 and 254, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 212 can be sized, shaped, and configured to impart a counteracting swirl to the fluid so that in a downstream direction aft of both fan blades 208 and vanes 212 the fluid has a greatly reduced degree of swirl, which translates to an increased level of induced efficiency. Vanes 212 may have a shorter span than fan blades 208, as shown in FIG. 2. For example, vanes 212 may have a span that is at least 50% of a span of fan blades 208. In some examples, the span of the vanes can be the same or longer than the span as fan blades 208, if desired. Vanes 212 may be attached to an aircraft structure associated with the engine 200, as shown in FIG. 2, or another aircraft structure such as a wing, pylon, or fuselage. Vanes 212 may be fewer or greater in number than, or the same in number as, the number of fan blades 208. In some examples, the number of vanes 212 are greater than two, or greater than four, in number. Fan blades 208 may be sized, shaped, and contoured with the desired blade loading in mind.

In the example shown in FIG. 2, an annular 360-degree inlet 258 is located between the fan assembly 204 and the vane assembly 210 and provides a path for incoming atmospheric air to enter the core engine 206 radially inwardly of at least a portion of the vane assembly 210. Such a location may be advantageous for a variety of reasons, including management of icing performance as well as protecting the inlet 258 from various objects and materials as may be encountered in operation.

In the example of FIG. 2, in addition to the open rotor or unducted fan assembly 204 with its plurality of fan blades 208, an optional ducted fan assembly 260 is included behind fan assembly 204, such that the engine 200 includes both a ducted and an unducted fan which both serve to generate thrust through the movement of air at atmospheric temperature without passage through the core engine 206. The ducted fan assembly 260 is shown at about the same axial location as the vane 212, and radially inward of the root 248 of the vane 212. Alternatively, the ducted fan assembly 260 may be between the vane 212 and a core duct 262 or be farther forward of the vane 212. The ducted fan assembly 260 may be driven by the low-pressure turbine 244, or by any other suitable source of rotation, and may serve as the first stage of the low-pressure compressor 242 or may be operated separately. Air entering the inlet 258 flows through an inlet duct 264 and then is divided such that a portion flows through the core duct 262 and a portion flows through a fan duct 266. Fan duct 266 may incorporate heat exchangers 268 and exhausts to the atmosphere through an independent fixed or variable nozzle 270 aft of the vane assembly 210 at the aft end of the fan cowl 252 and outside of the engine core cowl 272. Air flowing through the fan duct 266 thus "bypasses" the core of the engine and does not pass through the core engine 106.

Thus, in the example, engine 200 includes an unducted fan formed by the fan blades 208, followed by the ducted fan assembly 260, which directs airflow into two concentric or non-concentric ducts 262 and 266, thereby forming a three-stream engine architecture with three paths for air which passes through the fan assembly 204.

In the example shown in FIG. 2, a slidable, moveable, and/or translatable plug nozzle 274 with an actuator may be included in order to vary the exit area of the nozzle 270. A plug nozzle is typically an annular, symmetrical device that regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as variable bleed valves (VBVs), variable stator vanes (VSVs), or blade pitch mechanisms and may be designed with failure modes such as fully-open, fully-closed, or intermediate positions so that the nozzle 270 has a consistent "home" position to which it returns in the event of any system failure, which may prevent commands from reaching the nozzle 270 and/or its actuator.

In some examples, a mixing device 276 can be included in a region aft of a core nozzle 278 to aid in mixing the fan stream and the core stream to improve acoustic performance by directing core stream outward and fan stream inward.

Since the engine 200 shown in FIG. 2 includes both an open rotor fan assembly 204 and a ducted fan assembly 260, the thrust output of both and the work split between them can be tailored to achieve specific thrust, fuel burn, thermal management, and/or acoustic signature objectives which may be superior to those of a typical ducted fan gas turbine propulsion assembly of comparable thrust class. The ducted fan assembly 260, by lessening the proportion of the thrust required to be provided by the unducted fan assembly 104, may permit a reduction in the overall fan diameter of the unducted fan assembly and thereby provide for installation flexibility and reduced weight.

Operationally, the engine 200 may include a control system that manages the loading of the respective open and ducted fans, as well as potentially the exit area of the variable fan nozzle, to provide different thrust, noise, cooling capacity, and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow.

The ducted fan stream flowing through fan duct 266 may include one or more heat exchangers 268 for removing heat from various fluids used in engine operation (such as an air-cooled oil cooler (ACOC), cooled cooling air (CCA), etc.). The heat exchangers 268 may take advantage of the integration into the fan duct 266 with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical CO2, EGV, Slither 900, liquid metals, etc.), engine bleed air, etc. Heat exchangers may also be made up of different segments or passages that cool different working fluids, such as an ACOC paired with a fuel cooler. Heat exchangers 268 may be incorporated into a thermal management system which provides for thermal transport via a heat exchange fluid flowing through a network to remove heat from a source and transport it to a heat exchanger.

The fan duct 266 also provides other advantages in terms of reduced nacelle drag, enabling a more aggressive nacelle close-out, improved core stream particle separation, and inclement weather operation. Exhausting the fan duct flow over the engine core cowl 272 aids in energizing the boundary layer and enabling the option of a steeper nacelle close out angle between a maximum dimension of the engine core cowl 272 and the exhaust 256. The close-out angle is normally limited by air flow separation, but boundary layer energization by air from the fan duct 266 exhausting over the engine core cowl 272 reduces air flow separation. This yields a shorter, lighter structure with less frictional surface drag.

The fan assembly and/or vane assembly can be shrouded or unshrouded (as shown in FIGS. 1 and 2). Although not shown, an optional annular shroud or duct can be coupled to the vane assembly 210 and located distally from the engine centerline axis 220 relative to the vanes 212. In addition to the noise reduction benefit, the duct may provide improved vibratory response and structural integrity of the vanes 212 by coupling them into an assembly forming an annular ring or one or more circumferential sectors, i.e., segments forming portions of an annular ring linking two or more of the vanes 212. The duct may also allow the pitch of the vanes 212 to be varied more easily. For example, FIGS. 3-4, discussed in more detail below, disclose examples in which both the fan assembly and vane assembly are shrouded.

Although depicted as an unshrouded or open rotor engine in the examples depicted above, it should be appreciated that aspects of the disclosure provided herein may be applied to shrouded or ducted engines, partially ducted engines, aft-fan engines, or other turbomachinery configurations, including those for aero-propulsion systems. Certain aspects of the disclosure may be applicable to turbofan, turboprop, or turboshaft engines.

Figure 3:
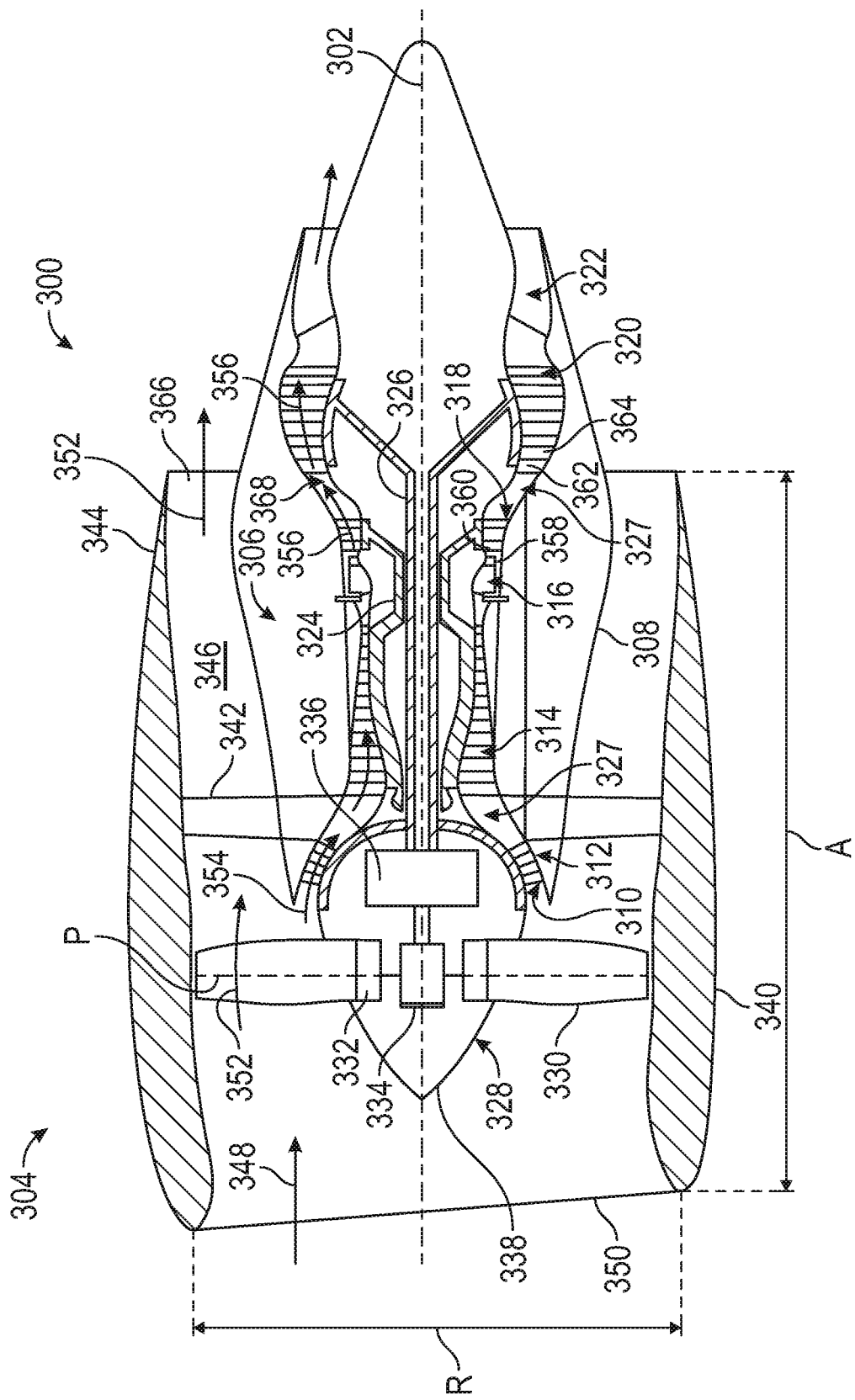
FIG. 3 is a cross-sectional schematic illustration of an example of a turbomachinery engine configured with a ducted propulsion system, according to the present disclosure.

FIG. 3 is a schematic cross-sectional view of a gas turbine engine in accordance with an example of the present disclosure. More particularly, for the example of FIG. 3, the gas turbine engine is a high-bypass turbofan engine 300, referred to herein as "turbofan engine 300." As shown in FIG. 3, the turbofan engine 300 defines an axial direction A (extending parallel to a longitudinal axis 302 or centerline provided for reference) and a radial direction R (extending perpendicular to the axial direction A). In general, the turbofan engine 300 includes a fan section 304 and a core engine 306 disposed downstream from the fan section 304. The turbofan engine 300 also includes a gear assembly or power gear box 336 having a plurality of gears for coupling a gas turbine shaft to a fan shaft. The position of the power gear box 336 is not limited to that as shown in the example of turbofan engine 300. For example, the position of the power gear box 336 may vary along the axial direction A.

The exemplary core engine 306 depicted generally includes a substantially tubular outer casing 308 that defines an annular inlet 310. The outer casing 308 encases, in serial flow relationship, a compressor section including a booster or low-pressure (LP) compressor 312 and a high-pressure (HP) compressor 314; a combustion section 316; a turbine section including a high-pressure (HP) turbine 318 and a low-pressure (LP) turbine 320; and a jet exhaust nozzle section 322. A high-pressure (HP) shaft or spool 324 drivingly connects the HP turbine 318 to the HP compressor 314. A low-pressure (LP) shaft or spool 326 drivingly connects the LP turbine 320 to the LP compressor 312. Additionally, the compressor section, combustion section 316, and turbine section together define at least in part a core air flowpath 327 extending therethrough.

A gear assembly of the present disclosure is compatible with standard fans, variable pitch fans, or other configurations. For the example depicted, the fan section 304 may include a variable pitch fan 328 having a plurality of fan blades 330 coupled to a disk 332 in a spaced-apart manner. As depicted, the fan blades 330 extend outwardly from disk 332 generally along the radial direction R. Each fan blade 330 is rotatable relative to the disk 332 about a pitch axis P by virtue of the fan blades 330 being operatively coupled to a suitable actuation member 334 configured to collectively vary the pitch of the fan blades 330. The fan blades 330, disk 332, and actuation member 334 are together rotatable about the longitudinal axis 302 by LP shaft 326 across a gear assembly 336. The gear assembly 336 may enable a speed change between a first shaft, e.g., LP shaft 326, and a second shaft, e.g., LP compressor shaft and/or fan shaft. For example, in some instances, the gear assembly 336 may be disposed in an arrangement between a first shaft and a second shaft such as to reduce an output speed from one shaft to another shaft.

More generally, the gear assembly 336 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan.

The gear assembly 336 (which can also be referred to as "a gearbox") can, in some examples, comprise a gear ratio of less than or equal to ten. For example, the gearbox 336 can comprise a gear ratio within a range of 2.0-10.0, 2.0-6.0, 2.0-4.0, 2.0-2.9, 3.0-3.5, 3.2-4.0, 3.25-3.75, etc. In one particular example, the gearbox 336 can comprise a gear ratio of 3.5.

Referring still to the example of FIG. 3, the disk 332 is covered by a rotatable front nacelle 338 aerodynamically contoured to promote airflow through the plurality of fan blades 330. Additionally, the exemplary fan section 304 includes an annular fan casing or outer nacelle 340 that circumferentially surrounds the fan 328 and/or at least a portion of the core engine 306. The nacelle 340 is, for the example depicted, supported relative to the core engine 306 by a plurality of circumferentially-spaced outlet guide vanes 342. Additionally, a downstream section 344 of the nacelle 340 extends over an outer portion of the core engine 306 so as to define a bypass airflow passage 346 therebetween.

During operation of the turbofan engine 300, a volume of air 348 enters the turbofan engine 300 through an associated inlet 350 of the nacelle 340 and/or fan section 304. As the volume of air 348 passes across the fan blades 330, a first portion of the air 348, as indicated by arrows 352, is directed or routed into the bypass airflow passage 346 and a second portion of the air 348, as indicated by arrow 354, is directed or routed into the LP compressor 312. The ratio between the first portion of air 352 and the second portion of air 354 is commonly known as a bypass ratio. The pressure of the second portion of air 354 is then increased as it is routed through the high-pressure (HP) compressor 314 and into the combustion section 316, where it is mixed with fuel and burned to provide combustion gases 356.

The combustion gases 356 are routed through the HP turbine 318 where a portion of thermal and/or kinetic energy from the combustion gases 356 is extracted via sequential stages of HP turbine stator vanes 358 that are coupled to the outer casing 308 and HP turbine rotor blades 360 (e.g., two stage) that are coupled to the HP shaft or spool 324, thus causing the HP shaft or spool 324 to rotate, thereby supporting operation of the HP compressor 314. The combustion gases 356 are then routed through the LP turbine 320 where a second portion of thermal and kinetic energy is extracted from the combustion gases 356 via sequential stages of LP turbine stator vanes 362 that are coupled to the outer casing 308 and LP turbine rotor blades 364 (e.g., four stages) that are coupled to the LP shaft or spool 326, thus causing the LP shaft or spool 326 to rotate, thereby supporting operation of the LP compressor 312 and/or rotation of the fan 328.

It should be noted that a high-pressure turbine (e.g., the HP turbine 318) can, in some examples, comprise one or two rotating blade stages and that a low-pressure turbine (e.g., LP turbine 320) can, in some instances, comprise three, four, five, six, or seven rotating blade stages.

The combustion gases 356 are subsequently routed through the jet exhaust nozzle section 322 of the core engine 306 to provide propulsive thrust. Simultaneously, the pressure of the first portion of air 352 is substantially increased as the first portion of air 352 is routed through the bypass airflow passage 346 before it is exhausted from a fan nozzle exhaust section 366 of the turbofan engine 300, also providing propulsive thrust. The HP turbine 318, the LP turbine 320, and the jet exhaust nozzle section 322 at least partially define a hot gas path 368 for routing the combustion gases 356 through the core engine 306.

Figure 4:
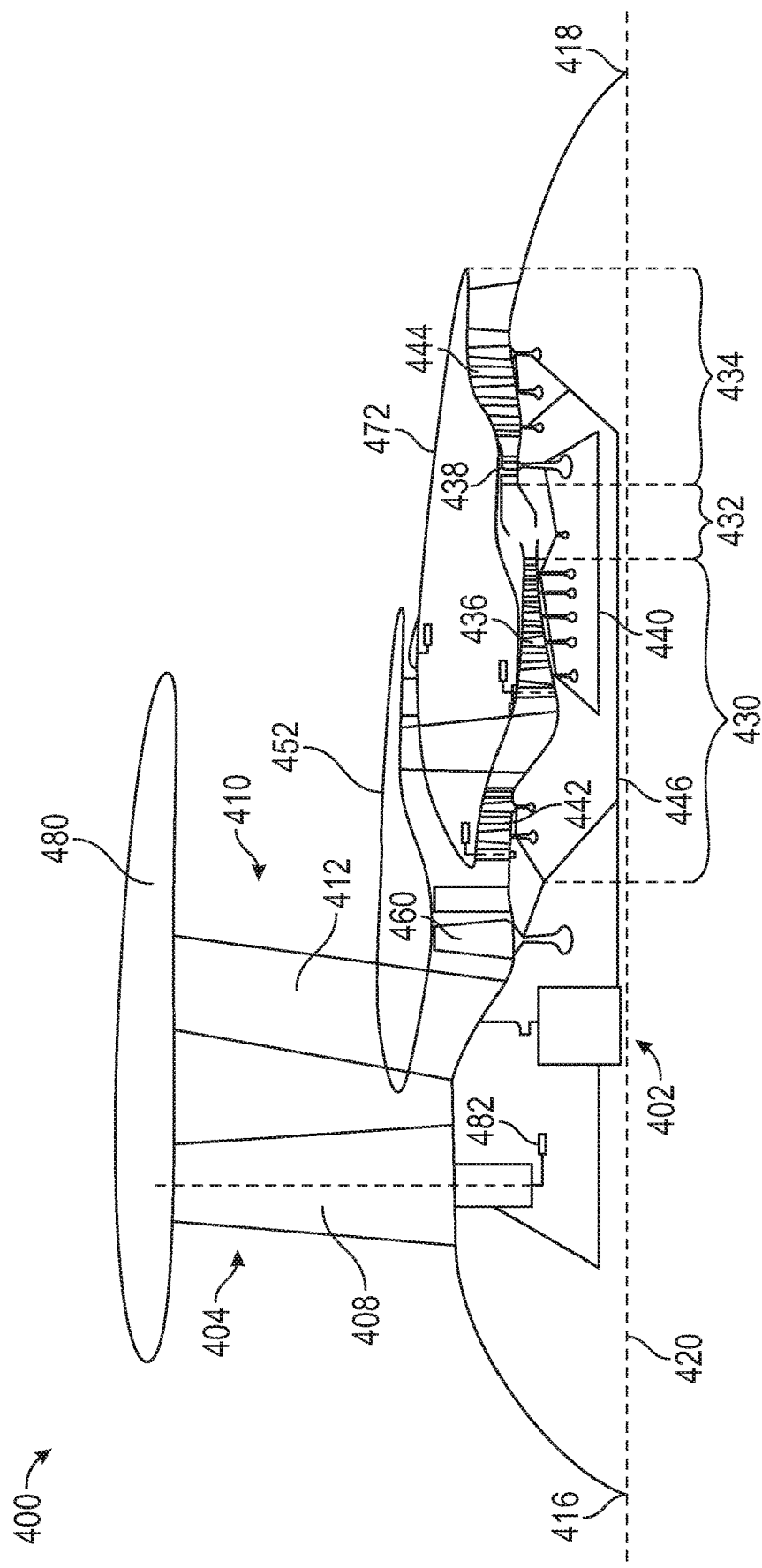
FIG. 4 is a cross-sectional schematic illustration of an example of a turbomachinery engine configured with a ducted propulsion system, according to the present disclosure.

FIG. 4 is a cross-sectional schematic illustration of an example of an engine 400 that includes a gear assembly 402 in combination with a ducted fan assembly 404 and a core engine. However, unlike the open rotor configuration of the engine 200 of FIG. 2, the ducted fan assembly 404 and its fan blades 408 are contained within an annular fan case 480 (which can also be referred to as "a nacelle") and a vane assembly 410 and vanes 412 extend radially between a fan cowl 452 (and/or an engine core cowl 472) and the inner surface of the fan case 480. As discussed above, the gear assemblies disclosed herein can provide for increased gear ratios for a fixed gear envelope (e.g., with the same size ring gear), or alternatively, a smaller diameter ring gear may be used to achieve the same gear ratios.

The core engine comprises a compressor section 430, a combustor section 432, and a turbine section 434. The compressor section 430 can include a high-pressure compressor 436 and a booster or a low-pressure compressor 442. The turbine section 434 can include a high-pressure turbine 438 (e.g., one stage) and a low-pressure turbine 444 (e.g., three stage). The low-pressure compressor 442 is positioned forward of and in flow relationship with the high-pressure compressor 436. The low-pressure compressor 442 is rotatably coupled with the low-pressure turbine 444 via a low-speed shaft 446 to enable the low-pressure turbine 444 to drive the low-pressure compressor 442 (and a ducted fan 460). The low-speed shaft 446 is also operably connected to the gear assembly 402 to provide power to the fan assembly 404. The high-pressure compressor 436 is rotatably coupled with the high-pressure turbine 438 via a high-speed shaft 440 to enable the high-pressure turbine 438 to drive the high-pressure compressor 436.

It should be noted that a high-pressure turbine (e.g., the high-pressure turbine 438) can, in some examples, comprise one or two stages and that a low-pressure turbine (e.g., the low-pressure turbine 444) can, in some instances, comprise three, four, five, or six rotating blade stages.

In some examples, the engine 400 can comprise a pitch change mechanism 482 coupled to the fan assembly 404 and configured to vary the pitch of the fan blades 408. In certain examples, the pitch change mechanism 482 can be a linear actuated pitch change mechanism.

In some examples, the engine 400 can comprise a variable fan nozzle. Operationally, the engine 400 may include a control system that manages the loading of the fan assembly 404, as well as potentially the exit area of the variable fan nozzle, to provide different thrust, noise, cooling capacity and other performance characteristics for various portions of the flight envelope and various operational conditions associated with aircraft operation. For example, nozzle actuation modulates the fan operating line and overall engine fan pressure ratio independent of total engine airflow.

The fans disclosed herein (e.g., the fan assemblies 104, 204, 304, and 404) can comprise various materials. For example, in some instances, a fan can comprise a metal alloy. In some instances, the metal alloy can comprise aluminum, lithium, titanium, and/or other suitable metals for fan blades (e.g., the fan blades 108, 208, 330, and 408). In some instances, a fan can comprise composite material. In some examples, a fan can comprise a metal alloy core and a composite cover.

The fans disclosed herein (e.g., the fan assemblies 104, 204, 304, and 404) can comprise various dimensions. For example, a fan can comprise a diameter (as measured at the tip of the leading edge) within a range of 72-120 inches (6-10 feet). In some instances, a fan can comprise a diameter within a range of 84-120 inches (7-10 feet) or 84-96 inches (7-8 feet).

The fans disclosed herein comprise a solidity. Solidity is based on average blade chord defined as the blade planform area (surface area on one side of a blade) divided by the blade radial span. The solidity is directly proportional to the number of blades and chord length and inversely proportional to the diameter. For purposes of this disclosure, solidity is equal to the average blade chord (C) times the number of fan blades (N) divided by the product of two (2) times pi ($\pi$) times a reference radius (R_ref), which herein is a radius equal to 0.75 times a tip radius of a rotor blade (Rt) (i.e., C×N/(2×$\pi$×R_ref)). Using this formula, a fan can comprise a solidity from 0.5 to 1.0, or more particularly from 0.6 to 1.0. In other examples, a fan can comprise a solidity from 1.1 to 1.5, or 1.1-1.3 in certain examples. In still other examples, enhanced performance can be observed when the solidity is greater than or equal to 0.8 and less than or equal to 2, greater than or equal to 0.8 and less than or equal to 1.5, greater than or equal to 1 and less than or equal to 2, or greater than or equal to 1.25 and less than or equal to 1.75.

As mentioned above, rising fuel prices, depleting natural resources, and regulatory constraints place increasing demands on turbomachinery engines. As such, turbomachinery engines with improved efficiency and performance are desired. Designing turbomachinery engines, however, is complex, time consuming, and expensive. There are many engine components and parameters to consider (each of various weight), and many are of the components and parameters are interdependent. Therefore, changing one component or one parameter can often create cascading effects requiring one or more other parameters or components to be reconfigured.

Various turbomachinery engines and gear assemblies are disclosed herein. The disclosed turbomachinery engines have improved efficiency and/or performance than typical turbomachinery engines.

The disclosed turbomachinery engines comprise a gearbox and a turbine (e.g., a low-pressure turbine) coupled to the gearbox. The disclosed turbomachinery engines are characterized or defined by one or more parameters of a turbine (e.g., the low-pressure turbine). These turbine parameters include: an area ratio and/or an area-EGT ratio.

After numerous engine designs, the inventors found unexpectedly that engines comprising the area ratio ranges and/or the area-EGT ratio ranges disclosed herein provide a turbomachine engine with improved performance and efficiency.

The low-pressure turbines disclosed herein comprise 3-5 rotating stages and an area ratio within a range of 2.0-6.5. Each rotating stage comprises an annular exit area defined by a tip radius of a trailing edge of any one blade of the rotating stage and a hub radius of the any one blade of the rotating stage at an axial location aligned with the tip radius. The area ratio equals the annular exit area of an aft-most rotating stage divided by the annular exit area of a forward-most rotating stage.

The low-pressure turbines disclosed herein additionally comprise an area-EGT ratio within a range of 1.3-1.6. The $$\text{area-}EGT \text{ ratio} = \frac{(\text{area ratio})^{(1/(stages-1))}}{(EGT/1000)}.$$

Each rotating stage comprises an annular exit area defined by a tip radius of a trailing edge of any one blade of the rotating stage and a hub radius of the any one blade of the rotating stage at an axial location aligned with the tip radius. The area ratio is the annular exit area of an aft-most rotating stage divided by the annular exit area of a forward-most rotating stage, wherein the stages is the number of rotating stages. The EGT is an exhaust gas temperature measured in degrees Celsius at an inlet of the turbine at a redline operating condition.

In some examples, a turbomachinery engine includes a fan assembly, a low-pressure turbine, and a gearbox. The fan assembly includes a plurality of fan blades. The low-pressure turbine includes 3-5 rotating stages. Each rotating stage of the low-pressure turbine includes an annular exit area defined by a tip radius of a trailing edge of any one blade of the rotating stage and a hub radius of the any one blade of the rotating stage at an axial location aligned with the tip radius. The low-pressure turbine includes an area ratio equal to the annular exit area of an aft-most rotating stage of the low-pressure turbine divided by the annular exit area of a forward-most rotating stage of the low-pressure turbine, and the area ratio is within a range of 2.0-6.5. The gearbox includes an input and an output. The input of the gearbox is coupled to the low-pressure turbine and includes a first rotational speed, and the output of the gearbox is coupled to the fan assembly and has a second rotational speed.

In some examples, the area ratio of the low-pressure turbine is within a range of 2.0-3.2.

In some examples, the area ratio of the low-pressure turbine is within a range of 2.2-4.6.

In some instances, the low-pressure turbine includes exactly three rotating stages and/or the area ratio of the low-pressure turbine is within a range of 2.2-2.91.

In some instances, the low-pressure turbine includes exactly four rotating stages, and/or the area ratio of the low-pressure turbine is within a range of 3.1-5.1.

In some instances, the low-pressure turbine includes exactly five rotating stages, and/or the area ratio of the low-pressure turbine is within a range of 5.0-6.5.

In some examples, a turbomachinery engine includes a fan assembly, a low-pressure turbine, and a gearbox. The fan assembly includes a plurality of fan blades. The low-pressure turbine comprising 3-4 rotating stages. Each rotating stage of the low-pressure turbine comprises an annular exit area defined by a tip radius of a trailing edge of any one blade of the rotating stage and a hub radius of the any one blade of the rotating stage at an axial location aligned with the tip radius. The low-pressure turbine comprises an area ratio equal to the annular exit area of an aft-most rotating stage of the low-pressure turbine divided by the annular exit area of a forward-most rotating stage of the low-pressure turbine, and the area ratio is within a range of 2.1-4.6. The gearbox including an input and an output. The input of the gearbox is coupled to the low-pressure turbine and comprises a first rotational speed, the output of the gearbox is coupled to the fan assembly and has a second rotational speed, and a gear ratio of the first rotational speed to the second rotational speed is within a range of 3.0-3.5.

In some examples, a turbomachinery engine comprises a fan assembly, a low-pressure turbine, and a gearbox. The fan assembly includes a plurality of fan blades. The low-pressure turbine comprises 4-5 rotating stages. Each rotating stage of the low-pressure turbine comprises an annular exit area defined by a tip radius of a trailing edge of any one blade of the rotating stage and a hub radius of the any one blade of the rotating stage at an axial location aligned with the tip radius. The low-pressure turbine comprises an area ratio equal to the annular exit area of an aft-most rotating stage of the low-pressure turbine divided by the annular exit area of a forward-most rotating stage of the low-pressure turbine, and the area ratio is within a range of 3.6-5.79. The gearbox includes an input and an output. The input of the gearbox is coupled to the low-pressure turbine and comprises a first rotational speed, the output of the gearbox is coupled to the fan assembly and has a second rotational speed, and a gear ratio of the first rotational speed to the second rotational speed is within a range of 5.0-10.0.

In some examples, a turbomachinery engine comprising a fan assembly, a low-pressure turbine, and a gearbox. The fan assembly including a plurality of fan blades. The low-pressure turbine comprises 3-5 rotating stages and an area-EGT ratio within a range of 1.3-1.6. The $$\text{area-}EGT \text{ ratio} = \frac{(\text{area ratio})^{(1/(LPT\ stages-1))}}{(EGT/1000)}.$$

Each rotating stage of the low-pressure turbine comprises an annular exit area defined by a tip radius of a trailing edge of any one blade of the rotating stage and a hub radius of the any one blade of the rotating stage at an axial location aligned with the tip radius. The area ratio is the annular exit area of an aft-most rotating stage of the low-pressure turbine divided by the annular exit area of a forward-most rotating stage of the low-pressure turbine. The LPT stages is the number of rotating stages of the low-pressure turbine. The EGT is an exhaust gas temperature of the low-pressure turbine measured in degrees Celsius at an inlet of the low-pressure turbine at a redline operating condition. The gearbox including an input and an output. The input of the gearbox is coupled to the low-pressure turbine and comprises a first rotational speed, and the output of the gearbox is coupled to the fan assembly and has a second rotational speed.

In some examples, the area-EGT ratio is within a range of 1.38-1.58.

In some examples, the area-EGT ratio is within a range of 1.31-1.53.

In some examples, the area-EGT ratio is within a range of 1.30-1.36.

Figure 5A:
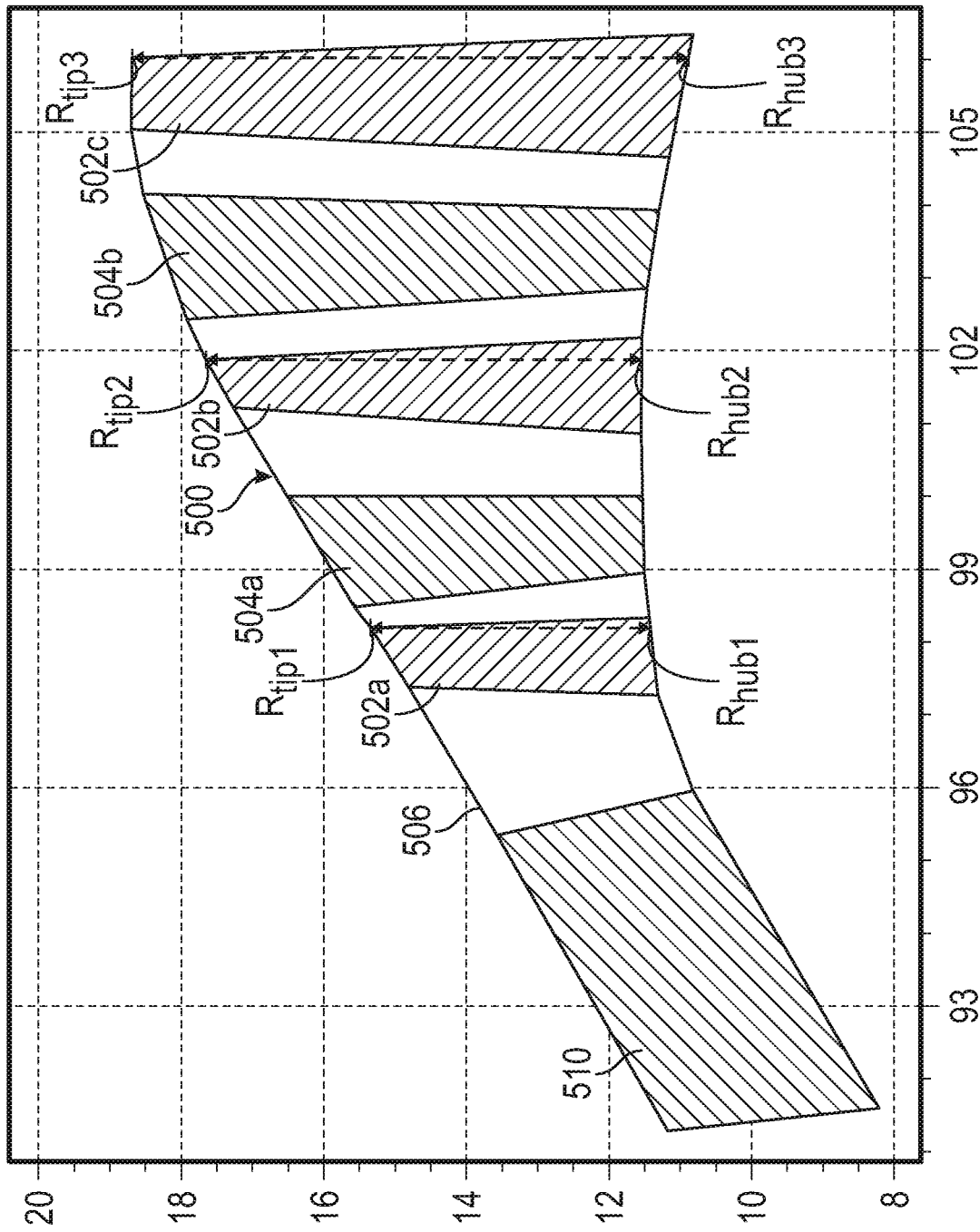
FIG. 5A is a cross-sectional schematic illustration of an example of a low-pressure turbine comprising three rotating blade stages, according to the present disclosure.

FIG. 5A depicts a portion of a three-stage low-pressure turbine 500, according to one example of the disclosed technology. The low-pressure turbine (LPT) 500 can be used, for example, with any of the turbomachinery engines disclosed herein (e.g., the engines 100, 200, 300, and 400), and particularly Engine 04 depicted in the table of FIG. 9. The LPT 500 comprises a plurality of rotating blade stages and a plurality of stationary vane stages. In particular, the depicted portion of the LPT 500 comprises three rotating blade stages 502a, 502b, and 502c and two stationary vane stages 504a and 504b. The rotating blade stages are referred to herein generically or collectively as "a/the rotating blade stage(s) 502" or simply "the blades 502," and the stationary vane stages are referred to herein generically or collectively as "a/the stationary vane stage(s) 504" or simply "the vanes 504."

The blades 502 and the vanes 504 are disposed within a duct 506, which guides the fluid flow through the LPT 500.

Each rotating blade stage 502 of the LPT 500 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

Figure 5B:
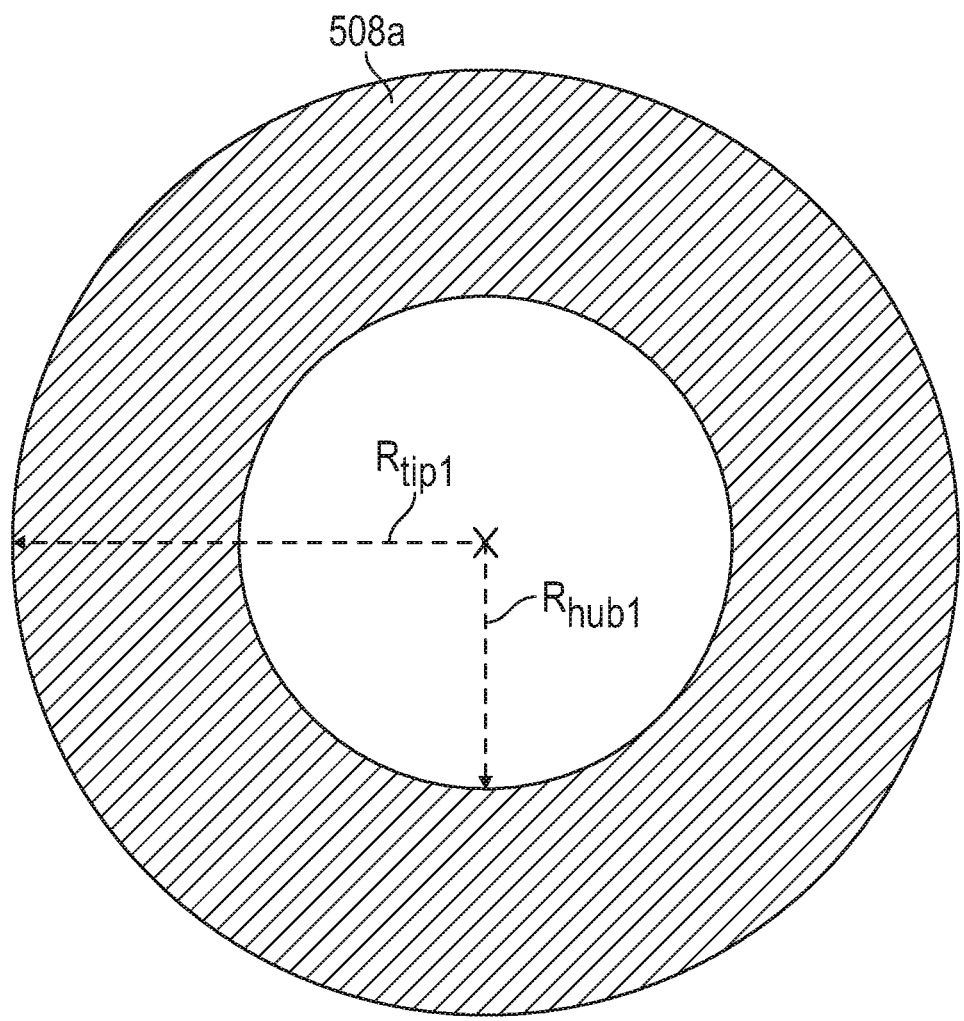
FIG. 5B is a cross-sectional schematic illustration depicting an exit area of a first rotating blade stage of the low-pressure turbine of FIG. 5A, according to the present disclosure.

For example, the forward-most rotating blade stage (which can also be referred to as "the first stage") 502a of the LPT 500 comprises an annular exit area 508a, as depicted in FIG. 5B. The annular exit area 508a is defined by the tip radius $R_{tip1}$ and hub radius $R_{hub1}$. $R_{tip1}$ is the tip radius of the trailing edge of any blade of the first stage 502a (or a nominal tip radius of the trailing edges of the blades of the first stage 502a), and $R_{hub1}$ is the hub radius of the blade (or a nominal hub radius of the blades of the first stage) at the axial location aligned with the tip radius $R_{tip1}$.

In some examples, the annular exit area of the first stage 502a can be within a range of 155-380 in$^2$ or within a range of 155-372 in$^2$. In particular examples, the annular exit area can be within a range of 280-380 in$^2$ or within a range of 285-372 in$^2$. In the depicted example, the annular exit area 508a of the first stage 502a is about 327 in$^2$. Additional examples of annular exit areas for the first stage of a three-stage low-pressure turbine are provided in the table depicted in FIG. 9.

As another example, the second stage 502b of the LPT 500 comprises an annular exit area. The annular exit area of the second stage 502b is defined by the tip radius $R_{tip2}$ and hub radius $R_{hub2}$. $R_{tip2}$ is the tip radius of the trailing edge of any blade of the second stage 502b (or a nominal tip radius of the trailing edges of the blades of the second stage 502b), and $R_{hub2}$ is the hub radius of the blade (or a nominal hub radius of the blades of the second stage 502b) at the axial location aligned with the tip radius $R_{tip2}$.

In some examples, the annular exit area of the second stage 502b can be within a range of 230-750 in$^2$ or within a range of 250-700 in². In particular examples, the annular exit area of the second stage 502b can be within a range of 450-750 in² or within a range of 462-699 in². In the depicted example, the annular exit area of the second stage 502b is about 526 in². Additional examples of annular exit areas for the second stage of a three-stage low-pressure turbine are provided in the table depicted in FIG. 9.

As another example, the aft-most stage (which can also be referred to as "the third stage") 502c of the LPT 500 comprises an annular exit area. The annular exit area of the third stage 502c is defined by the tip radius $R_{tip3}$ and hub radius $R_{hub3}$. $R_{tip3}$ is the tip radius of the trailing edge of any blade of the third stage 502c (or a nominal tip radius of the trailing edges of the blades of the third stage 502c), and $R_{hub3}$ is the hub radius of the blade (or a nominal hub radius of the blades of the third stage 502c) at the axial location aligned with the tip radius $R_{tip3}$.

In some examples, the annular exit area of the third stage 502c can be within a range of 350-1050 in² or within a range of 379-1027 in². In particular examples, the annular exit area of the third stage 502c can be within a range of 600-1050 in² or within a range of 639-1027 in². In the depicted example, the annular exit area of the third stage 502c is about 725 in². Additional examples of annular exit areas for the third stage of a low-pressure turbine are provided in the table depicted in FIG. 9.

The LPT 500 comprises an area ratio (which can also be referred to as "an exit area ratio") within a range of 2.0-6.5, within a range of 2.0-3.0, within a range of 2.2-2.91, and specifically about 2.2. The area ratio equals the annular exit area of an aft-most rotating stage of the low-pressure turbine divided by the annular exit area of a forward-most rotating stage of the low-pressure turbine. For example, for the LPT 500, the area ratio equals the annular exit area of the third stage 502c divided by the annular exit area 508a of the first stage 502a.

In addition to having an area ratio within a range of 2.0-6.5, the LPT 500 can comprise an area-exhaust gas temperature (EGT) ratio, referred to herein as area-EGT ratio, within a range of 1.3-1.6, within a range of 1.38-1.58, and specifically about 1.38. The area-EGT ratio is defined according to Expression (1):

$$\text{area-}EGT \text{ ratio} = \frac{(\text{the area ratio})^{(1/(LPT \text{ stages}-1))}}{(EGT/1000)} \quad (1)$$

where the area ratio is as defined above, LPT stages is the number of rotating blade stages of LPT, and EGT is an exhaust gas temperature of the LPT measured in degrees Celsius at an inlet of the LPT at a redline operating condition.

In some examples, the number of LPT stages is 3, 4, or 5. For example, the LPT 500 includes exactly three stages. The table of FIG. 9 provides additional exemplary engines comprising exactly three LPT stages.

In some examples, EGT is within a range of 1060-1180 degrees Celsius measured at the inlet of the LPT at the redline operating condition. For example, the EGT of the LPT 500 is about 1083 degrees Celsius at the redline operating condition. As used herein the inlet of the LPT is defined by the turbine vane frame (TVF). The EGT can be measured at any axial location aligned with the TVF, i.e., from the leading edge to the trailing edge of the TVF. Thus, with respect to the LPT 500, the inlet of the LPT 500 for purposes of measuring EGT is any axial location aligned with a TVF 510.

Additional information about the LPT 500, and its corresponding engine (i.e., Engine 04), is provided in the table depicted in FIG. 9.

Figure 6:
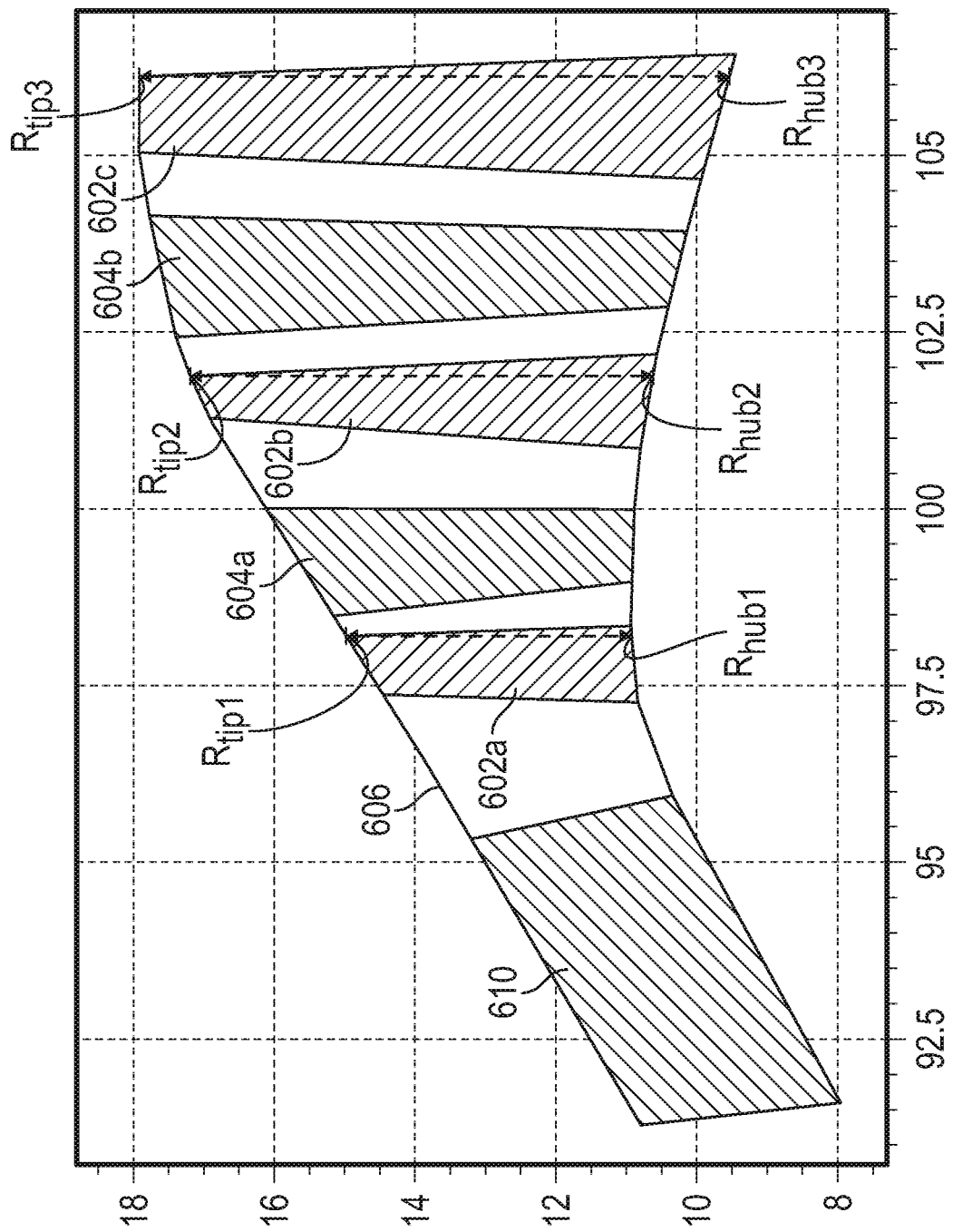
FIG. 6 is a cross-sectional schematic illustration of another example of a low-pressure turbine comprising three rotating blade stages, according to the present disclosure.

FIG. 6 depicts a portion of a low-pressure turbine 600, according to one example of the disclosed technology. The low-pressure turbine 600 can be used, for example, with any of the turbomachinery engines disclosed herein (e.g., the engines 100, 200, 300, and 400), and particularly Engine 05 depicted in the table of FIG. 9. The LPT 600 comprises a plurality of rotating blade stages and a plurality of stationary vane stages. In particular, the depicted portion of the LPT 600 comprises three rotating blade stages 602a, 602b, and 602c and two stationary vane stages 604a and 604b. The rotating blade stages are referred to herein generically or collectively as "a/the rotating blade stage(s) 602" or simply "the blades 602," and the stationary vane stages are referred to herein generically or collectively as "a/the stationary vane stage(s) 604" or simply "the vanes 604."

The blades 602 and the vanes 604 are disposed within a duct 606 aft of a TVF 610, which guides the fluid flow through the LPT 600.

Each rotating blade stage 602 of the LPT 600 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius.

For example, the forward-most rotating blade stage (which can also be referred to as "the first stage") 602a of the LPT 600 comprises an annular exit area. The annular exit area is defined by the tip radius $R_{tip1}$ and hub radius $R_{hub1}$. $R_{tip1}$ is the tip radius of the trailing edge of any blade of the first stage 602a (or a nominal tip radius of the trailing edges of the blades of the first stage 602a), and $R_{hub1}$ is the hub radius of the blade (or a nominal hub radius of the blades of the first stage) at the axial location aligned with the tip radius $R_{tip1}$.

In some examples, the annular exit area of the first stage 602a can be within a range of 155-380 in². In particular examples, the annular exit area can be within a range of 280-380 in² or within a range of 285-372 in². In the depicted example, the annular exit area of the first stage 602a is about 327 in².

As another example, the second stage 602b of the LPT 600 comprises an annular exit area. The annular exit area of the second stage 602b is defined by the tip radius $R_{tip2}$ and hub radius $R_{hub2}$. $R_{tip2}$ is the tip radius of the trailing edge of any blade of the second stage 602b (or a nominal tip radius of the trailing edges of the blades of the second stage 602b), and $R_{hub2}$ is the hub radius of the blade (or a nominal hub radius of the blades of the second stage 602b) at the axial location aligned with the tip radius $R_{tip2}$.

In some examples, the annular exit area of the second stage 602b can be within a range of 230-750 in² or within a range of 250-700 in². In particular examples, the annular exit area of the second stage 602b can be within a range of 450-750 in² or within a range of 462-699 in². In the depicted example, the annular exit area of the second stage 602b is about 577 in².

As another example, the aft-most stage (which can also be referred to as "the third stage") 602c of the LPT 600 comprises an annular exit area. The annular exit area of the third stage 602c is defined by the tip radius $R_{tip3}$ and hub radius $R_{hub3}$. $R_{tip3}$ is the tip radius of the trailing edge of any blade of the third stage 602c (or a nominal tip radius of the trailing edges of the blades of the third stage 602c), and $R_{hub3}$ is the hub radius of the blade (or a nominal hub radius of the blades of the third stage 602c) at the axial location aligned with the tip radius $R_{tip3}$.

In some examples, the annular exit area of the third stage 602c can be within a range of 350-1050 in² or within a range of 379-1027 in². In particular examples, the annular exit area of the third stage 602c can be within a range of 700-1050 in² or within a range of 639-1027 in². In the depicted example, the annular exit area of the third stage 602c is about 827 in².

The LPT 600 comprises an area ratio (which can also be referred to as "an exit area ratio") within a range of 2.0-6.5, within a range of 2.0-3.0, within a range of 2.2-2.9, and specifically about 2.53. For example, for the LPT 600, the area ratio equals the annular exit area of the third stage 602c divided by the annular exit area of the first stage 602a.

The LPT 600 can also comprise an area-EGT ratio within a range of 1.3-1.6, within a range of 1.35-1.58, and specifically about 1.47.

In some examples, the EGT of the LPT 600 is within a range of 1060-1180 degrees Celsius measured at the inlet of the LPT at the redline operating condition. For example, the LPT 600 comprises an EGT of about 1083 degrees Celsius at the redline operating condition.

Additional information about the LPT 600, and its corresponding engine (i.e., Engine 05), is provided in the table depicted in FIG. 9.

Figure 7:
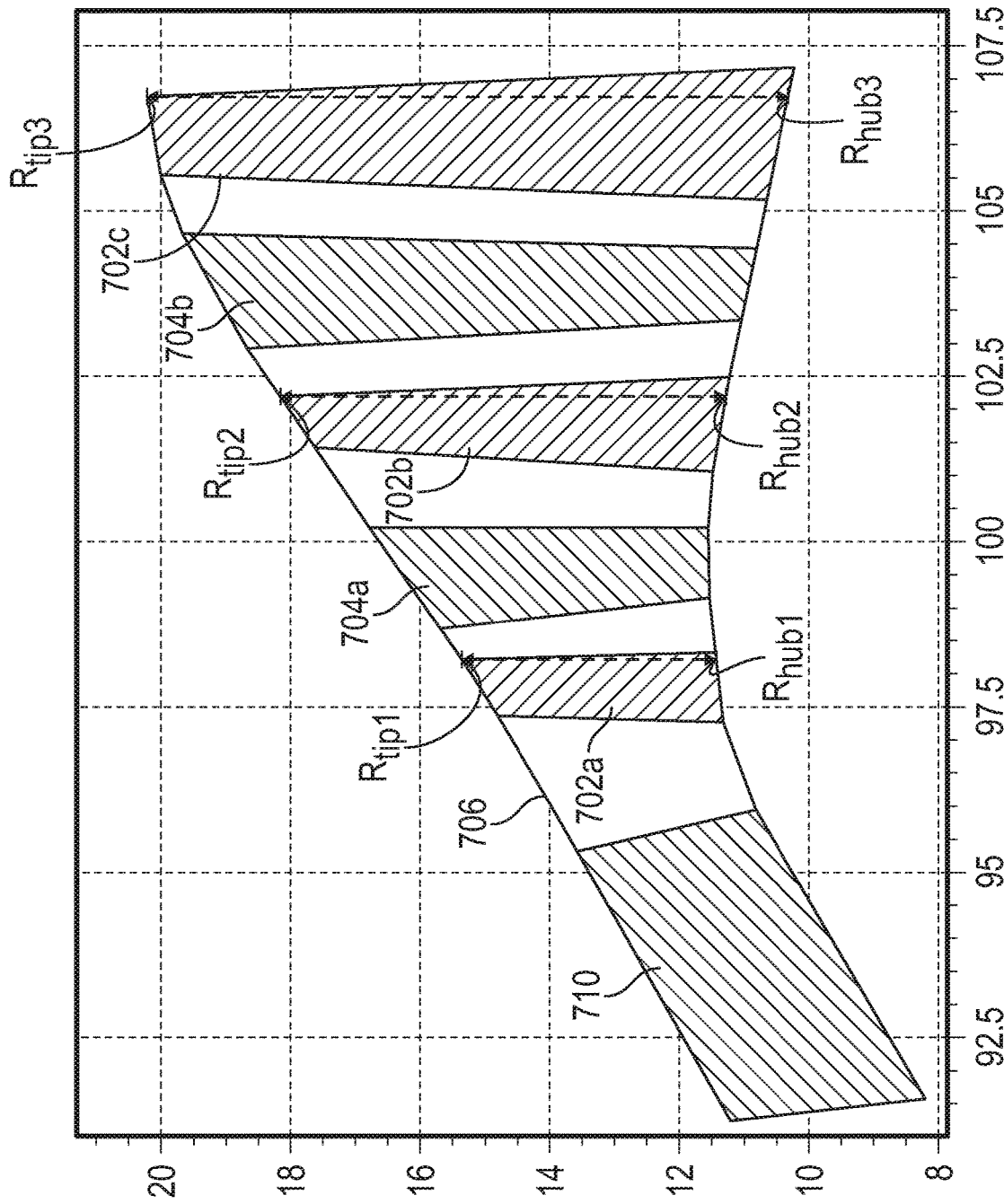
FIG. 7 is a cross-sectional schematic illustration of another example of a low-pressure turbine comprising three rotating blade stages, according to the present disclosure.

FIG. 7 depicts a portion of a low-pressure turbine 700, according to one example of the disclosed technology. The low-pressure turbine 700 can be used, for example, with any of the turbomachinery engines disclosed herein (e.g., the engines 100, 200, 300, and 400), and particularly Engine 07 depicted in the table of FIG. 9. The LPT 700 comprises a plurality of rotating blade stages and a plurality of stationary vane stages. In particular, the depicted portion of the LPT 700 comprises three rotating blade stages 702a, 702b, and 702c and two stationary vane stages 704a and 704b. The rotating blade stages are referred to herein generically or collectively as "a/the rotating blade stage(s) 702" or simply "the blades 702," and the stationary vane stages are referred to herein generically or collectively as "a/the stationary vane stage(s) 704" or simply "the vanes 704."

The blades 702 and the vanes 704 are disposed within a duct 706 aft of a TVF 710, which guides the fluid flow through the LPT 700.

Each rotating blade stage 702 of the LPT 700 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

For example, the forward-most rotating blade stage (which can also be referred to as "the first stage") 702a of the LPT 700 comprises an annular exit area. The annular exit area is defined by the tip radius $R_{tip1}$ and hub radius $R_{hub1}$. $R_{tip1}$ is the tip radius of the trailing edge of any blade of the first stage 702a (or a nominal tip radius of the trailing edges of the blades of the first stage 702a), and $R_{hub1}$ is the hub radius of the blade (or a nominal hub radius of the blades of the first stage) at the axial location aligned with the tip radius $R_{tip1}$.

In some examples, the annular exit area of the first stage 702a can be within a range of 155-380 in². In particular examples, the annular exit area can be within a range of 280-380 in². In the depicted example, the annular exit area of the first stage 702a is about 372 in².

As another example, the second stage 702b of the LPT 700 comprises an annular exit area. The annular exit area of the second stage 702b is defined by the tip radius $R_{tip2}$ and hub radius $R_{hub2}$. $R_{tip2}$ is the tip radius of the trailing edge of any blade of the second stage 702b (or a nominal tip radius of the trailing edges of the blades of the second stage 702b), and $R_{hub2}$ is the hub radius of the blade (or a nominal hub radius of the blades of the second stage 702b) at the axial location aligned with the tip radius $R_{tip2}$.

In some examples, the annular exit area of the second stage 702b can be within a range of 250-710 in². In particular examples, the annular exit area of the second stage 702b can be within a range of 450-700 in². In the depicted example, the annular exit area of the second stage 702b is about 700 in².

As another example, the aft-most stage (which can also be referred to as "the third stage") 702c of the LPT 700 comprises an annular exit area. The annular exit area of the third stage 702c is defined by the tip radius $R_{tip3}$ and hub radius $R_{hub3}$. $R_{tip3}$ is the tip radius of the trailing edge of any blade of the third stage 702c (or a nominal tip radius of the trailing edges of the blades of the third stage 702c), and $R_{hub3}$ is the hub radius of the blade (or a nominal hub radius of the blades of the third stage 702c) at the axial location aligned with the tip radius $R_{tip3}$.

In some examples, the annular exit area of the third stage 702c can be within a range of 350-1100 in². In particular examples, the annular exit area of the third stage 702c can be within a range of 380-1050 in² or within a range of 639-1027 in². In the depicted example, the annular exit area of the third stage 702c is about 1027 in².

The LPT 700 comprises an area ratio (which can also be referred to as "an exit area ratio") within a range of 2.0-6.5, within a range of 2.22-2.91, and specifically about 2.76. For example, for the LPT 700, the area ratio equals the annular exit area of the third stage 702c divided by the annular exit area of the first stage 702a.

The LPT 700 can, additionally or alternatively to the area ratio within a range of 2.0-6.5, comprise an area-EGT ratio within a range of 1.3-1.6, within a range of 1.35-1.55, and specifically 1.53.

In some examples, EGT of the LPT 700 is within a range of 1060-1180 degrees Celsius measured at the inlet of the LPT at the redline operating condition. For example, the LPT 700 comprises an EGT of about 1083 degrees Celsius at the redline operating condition.

Additional information about the LPT 700, and its corresponding engine (i.e., Engine 07), is provided in the table depicted in FIG. 9.

Figure 8:
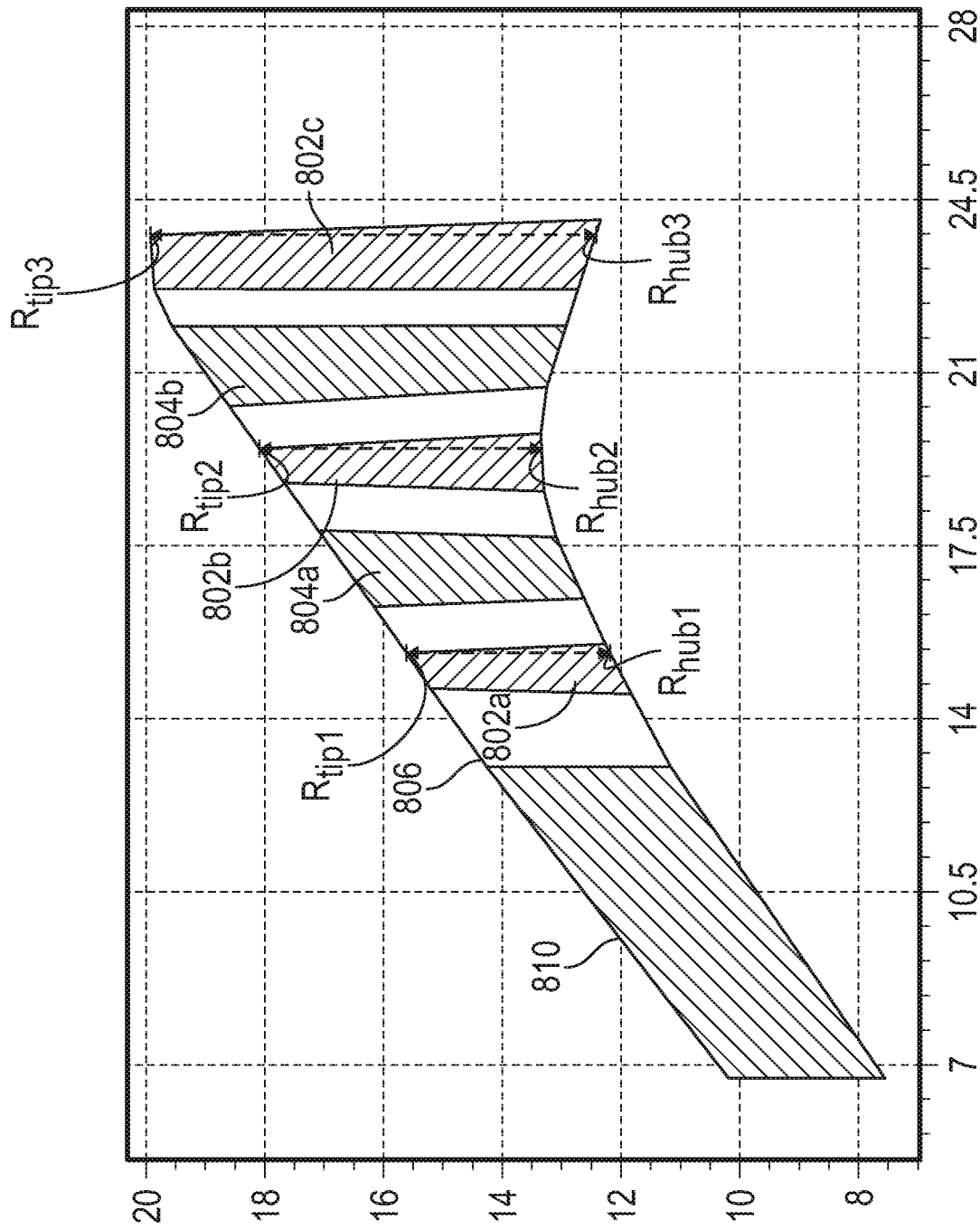
FIG. 8 is a cross-sectional schematic illustration of another example of a low-pressure turbine comprising three rotating blade stages, according to the present disclosure.

FIG. 8 depicts a portion of a low-pressure turbine 800, according to one example of the disclosed technology. The low-pressure turbine 800 can be used, for example, with any of the turbomachinery engines disclosed herein (e.g., the engines 100, 200, 300, and 400), and particularly Engine 09 depicted in the table of FIG. 9. The LPT 800 comprises a plurality of rotating blade stages and a plurality of stationary vane stages. In particular, the depicted portion of the LPT 800 comprises three rotating blade stages 802a, 802b, and 802c and two stationary vane stages 804a and 804b. The rotating blade stages are referred to herein generically or collectively as "a/the rotating blade stage(s) 802" or simply "the blades 802," and the stationary vane stages are referred to herein generically or collectively as "a/the stationary vane stage(s) 804" or simply "the vanes 804."

The blades 802 and the vanes 804 are disposed within a duct 806 aft of a TVF 810, which guides the fluid flow through the LPT 800.

Each rotating blade stage 802 of the LPT 800 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

The LPT 800 comprises three rotating blade stages, a redline EGT of 1067 degrees Celsius, a first stage exit area of 293.2 in$^2$, a second stage exit area of 476 in$^2$, a third stage exit area of 764.9 in$^2$, an area ratio of 2.61, an area-EGT ratio of 1.51, a first stage $AN^2$ value of 30, and a third stage $AN^2$ value of 80. $AN^2$ the product of A and $N^2$, where A is the annular exit area of a particular rotating stage of the low-pressure turbine measured in square inches, N is the rotational speed of the low-pressure turbine measured in revolutions per minute at a redline operating condition, and the product of $AN^2$ is divided by $10^9$.

FIG. 9 provides additional information about the LPT 800 (see Engine 09).

FIG. 9 provides a table with several additional examples of turbomachinery engines comprising three rotating blade stages, a LPT with an area ratio within a range of 2.0-6.5 and an area-EGT ratio within a range of 1.3-1.6. The engines disclosed in FIG. 9 comprise a gear ratio of 2-9 or 2.95-8.33. The EGT at a redline operating condition for the engines of FIG. 9 is within a range of 1060-1175 degrees Celsius or within a range of 1067-1083 degrees Celsius. The exit area of stage 1 of the disclosed engines is within a range of 155-380 in$^2$ or within a range of 285.0-372.4 in$^2$. The exit area of stage 2 of the engines of FIG. 9 is within a range of 230-750 in$^2$ or within a range of 461.8-699.5 in$^2$. The exit area of stage 3 of the engines of FIG. 9 is within a range of 350-1050 in$^2$ or within a range of 638.5-1026.5 in$^2$. The area ratio of the engines disclosed in FIG. 9 is within a range of 2.0-6.5 or within a range of 2.22-2.91. The area-EGT ratio is within a range of 1.3-1.6 or within a range of 1.38-1.58. The engines disclosed in FIG. 9 comprise a first stage $AN^2$ value within a range of 9-36 or within a range of 30-36 at a redline operating condition. The engines disclosed in FIG. 9 comprise a third stage (exit) $AN^2$ value within a range of 44-104 or within a range of 79-104 at a redline operating condition.

FIGS. 10-12 provide examples of low-pressure turbines comprising four rotating blade stages. The disclosed LPTs comprise an area ratio within a range of 2.0-6.5 and an area-EGT ratio within a range of 1.3-1.6.

FIG. 10 depicts a portion of a four-stage low-pressure turbine 900, according to one example of the disclosed technology. The low-pressure turbine 900 can be used, for example, with any of the turbomachinery engines disclosed herein (e.g., the engines 100, 200, 300, and 400), and particularly Engine 16 depicted in the table of FIG. 12. The LPT 900 comprises a plurality of rotating blade stages and a plurality of stationary vane stages. In particular, the depicted portion of the LPT 900 comprises four rotating blade stages 902a, 902b, 902c, and 902d and three stationary vane stages 904a, 904b, and 904c. The rotating blade stages are referred to herein generically or collectively as "a/the rotating blade stage(s) 902" or simply "the blades 902," and the stationary vane stages are referred to herein generically or collectively as "a/the stationary vane stage(s) 904" or simply "the vanes 904."

The blades 902 and the vanes 904 are disposed within a duct 906 aft of a TVF 910, which guides the fluid flow through the LPT 900.

Each rotating blade stage 902 of the LPT 900 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

The LPT 900 comprises four rotating blade stages, a redline EGT of 1080 degrees Celsius, a first stage exit area of 299.2 in$^2$, a second stage exit area of 442.1 in$^2$, a third stage exit area of 618.3 in$^2$, a fourth stage exit area of 998.1 in$^2$, an area ratio of 3.34, an area-EGT ratio of 1.38, a first stage $AN^2$ value of 13, and a fourth stage $AN^2$ value of 44. FIG. 12 provides additional information about the LPT 900 (see Engine 16).

FIG. 11 depicts a portion of a four-stage low-pressure turbine 1000, according to one example of the disclosed technology. The low-pressure turbine 1000 can be used, for example, with any of the turbomachinery engines disclosed herein (e.g., the engines 100, 200, 300, and 400), and particularly Engine 16 depicted in the table of FIG. 12. The LPT 1000 comprises a plurality of rotating blade stages and a plurality of stationary vane stages. In particular, the depicted portion of the LPT 1000 comprises four rotating blade stages 1002a, 1002b, 1002c, and 1002d and three stationary vane stages 1004a, 1004b, and 1004c. The rotating blade stages are referred to herein generically or collectively as "a/the rotating blade stage(s) 1002" or simply "the blades 1002," and the stationary vane stages are referred to herein generically or collectively as "a/the stationary vane stage(s) 1004" or simply "the vanes 1004."

The blades 1002 and the vanes 1004 are disposed within a duct 1006 aft of a TVF 1010, which guides the fluid flow through the LPT 1000.

Each rotating blade stage 1002 of the LPT 1000 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

The LPT 1000 comprises four rotating blade stages, a redline EGT of 1175 degrees Celsius, a first stage exit area of 222.4 in$^2$, a second stage exit area of 350.7 in$^2$, a third stage exit area of 612.1 in$^2$, a fourth stage exit area of 907.7 in$^2$, an area ratio of 4.08, an area-EGT ratio of 1.36, a first stage $AN^2$ value of 20, and a fourth stage $AN^2$ value of 80. FIG. 12 provides additional information about the LPT 1000 (see Engine 22).

FIG. 12 provides a table with several additional examples of turbomachinery engines comprising four rotating blade stages, a LPT with an area ratio within a range of 2.0-6.5 and an area-EGT ratio within a range of 1.3-1.6. The engines disclosed in FIG. 12 comprise a gear ratio of 2.0-9.0 or 2.33-8.70. The EGT at a redline operating condition for the engines of FIG. 12 is within a range of 1060-1175 degrees Celsius. The exit area of stage 1 of the disclosed engines is within a range of 155-380 in$^2$ or within a range of 171.9-299.2 in$^2$. The exit area of stage 2 of the engines of FIG. 12 is within a range of 230-750 in$^2$ or within a range of 275.0-516.4 in$^2$. The exit area of stage 3 of the engines of FIG. 12 is within a range of 350-1050 in$^2$ or within a range of 496.9-850.8 in$^2$. The exit area of stage 4 of the engines of FIG. 12 is within a range of 630-1200 in$^2$, within a range of 632-1186 in$^2$, or within a range of 632.0-1185.1 in$^2$. The area ratio of the engines disclosed in FIG. 12 is within a range of 2.0-6.5 or within a range of 3.06-5.09. The area-EGT ratio is within a range of 1.3-1.6 or within a range of 1.36-1.53. The engines disclosed in FIG. 12 comprise a first stage AN$^2$ value within a range of 9-36 or within a range of 13-24 at a redline operating condition. The engines disclosed in FIG. 12 comprise a fourth stage (exit) AN$^2$ value within a range of 44-104 or within a range of 44-94 at a redline operating condition.

Figure 13:
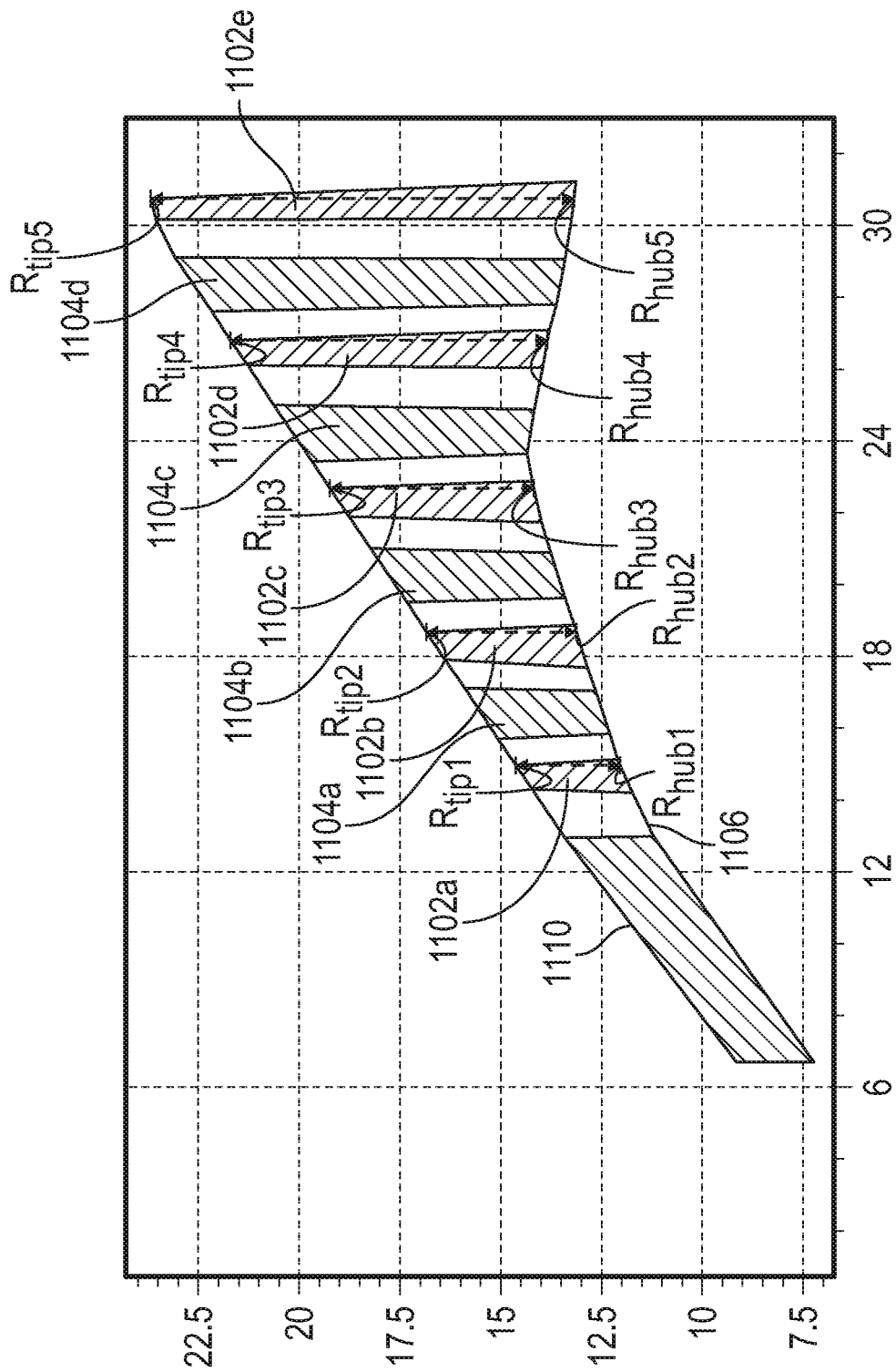
FIG. 13 is a cross-sectional schematic illustration of an example of a low-pressure turbine comprising five rotating blade stages, according to the present disclosure.
Figure 14:
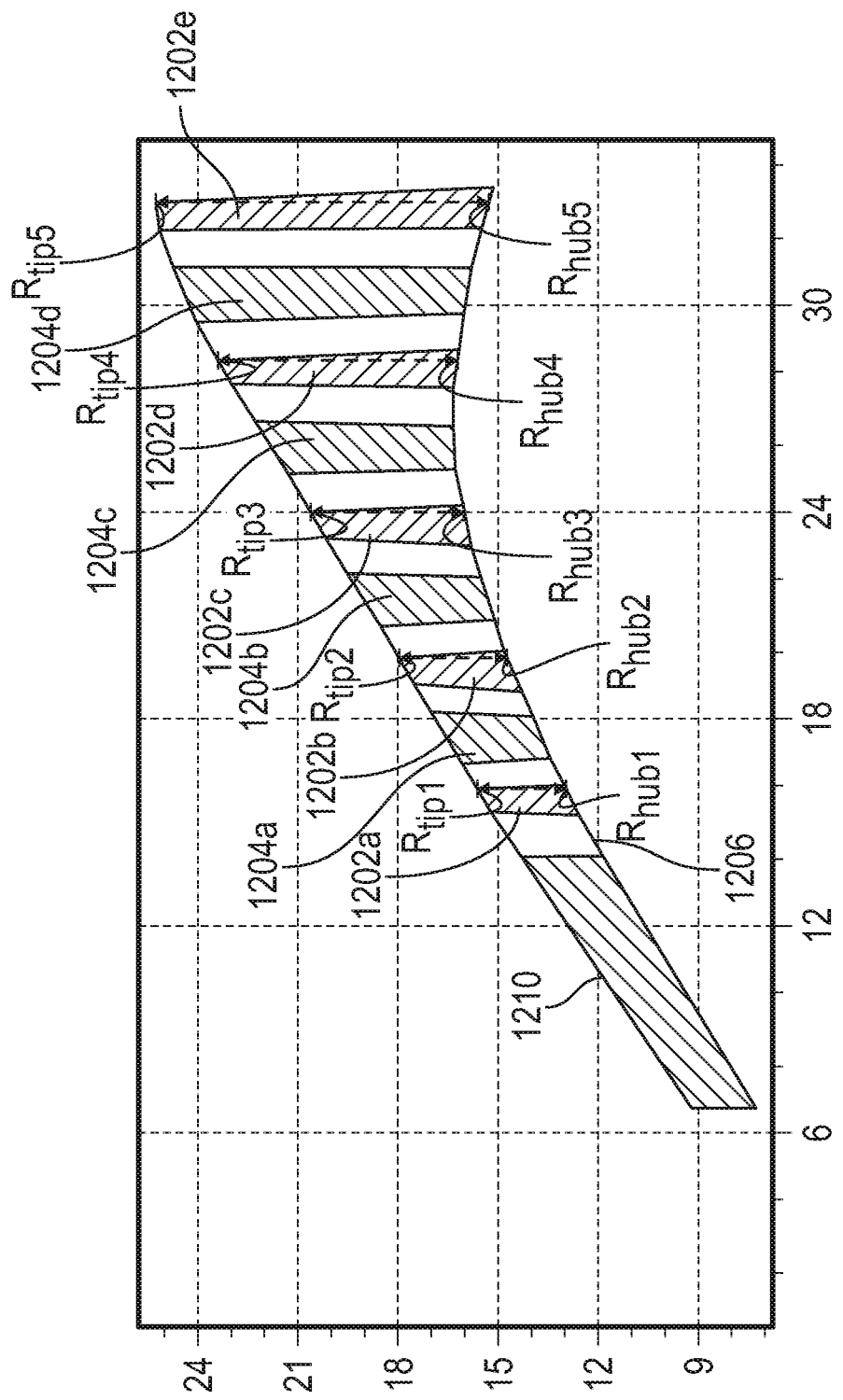
FIG. 14 is a cross-sectional schematic illustration of another example of a low-pressure turbine comprising five rotating blade stages, according to the present disclosure.

FIGS. 13-15 provide examples of low-pressure turbines comprises five rotating blade stages. The disclosed LPTs comprise an area ratio within a range of 2.0-6.5 and an area-EGT ratio within a range of 1.3-1.6.

FIG. 13 depicts a portion of a five-stage low-pressure turbine 1100, according to one example of the disclosed technology. The low-pressure turbine 1100 can be used, for example, with any of the turbomachinery engines disclosed herein (e.g., the engines 100, 200, 300, and 400), and particularly Engine 33 depicted in the table of FIG. 15. The LPT 1100 comprises a plurality of rotating blade stages and a plurality of stationary vane stages. In particular, the depicted portion of the LPT 1100 comprises five rotating blade stages 1102a, 1102b, 1102c, 1102d, and 1102e and four stationary vane stages 1104a, 1104b, 1104c, and 1104d. The rotating blade stages are referred to herein generically or collectively as "a/the rotating blade stage(s) 1102" or simply "the blades 1102," and the stationary vane stages are referred to herein generically or collectively as "a/the stationary vane stage(s) 1104" or simply "the vanes 1104."

The blades 1102 and the vanes 1104 are disposed within a duct 1106 aft of a TVF 1110, which guides the fluid flow through the LPT 1100.

Each rotating blade stage 1102 of the LPT 1100 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

The LPT 1100 comprises five rotating blade stages, a redline EGT of 1175 degrees Celsius, a first stage exit area of 212.1 in$^2$, a second stage exit area of 341.6 in$^2$, a third stage exit area of 524.5 in$^2$, a fourth stage exit area of 875.0 in$^2$, a fifth stage exit area of 1212.0 in$^2$, an area ratio of 5.72, an area-EGT ratio of 1.32, a first stage AN$^2$ value of 15, and a fifth stage AN$^2$ value of 84. FIG. 15 provides additional information about the LPT 1100 (see Engine 33).

FIG. 14 depicts a portion of a five-stage low-pressure turbine 1200, according to one example of the disclosed technology. The low-pressure turbine 1200 can be used, for example, with any of the turbomachinery engines disclosed herein (e.g., the engines 100, 200, 300, and 400), and particularly Engine 36 depicted in the table of FIG. 15. The LPT 1200 comprises a plurality of rotating blade stages and a plurality of stationary vane stages. In particular, the depicted portion of the LPT 1200 comprises five rotating blade stages 1202a, 1202b, 1202c, 1202d, and 1202e and four stationary vane stages 1204a, 1204b, 1204c, and 1204d. The rotating blade stages are referred to herein generically or collectively as "a/the rotating blade stage(s) 1202" or simply "the blades 1202," and the stationary vane stages are referred to herein generically or collectively as "a/the stationary vane stage(s) 1204" or simply "the vanes 1204."

The blades 1202 and the vanes 1204 are disposed within a duct 1206 aft of a TVF 1210, which guides the fluid flow through the LPT 1200.

Each rotating blade stage 1202 of the LPT 1200 comprises an annular exit area defined by a tip radius of a trailing edge of any blade of the rotating stage (or a nominal tip radius of the stage) and a hub radius of the blade of the rotating stage (or a nominal hub radius of the stage) at the axial location aligned with the tip radius. With respect shrouded turbine blades, the tip radius is the radius at the tip of the blade portion, excluding the shroud portion.

The LPT 1200 comprises five rotating blade stages, a redline EGT of 1175 degrees Celsius, a first stage exit area of 232.6 in$^2$, a second stage exit area of 326.9 in$^2$, a third stage exit area of 527.7 in$^2$, a fourth stage exit area of 895.0 in$^2$, a fifth stage exit area of 1279.3 in$^2$, an area ratio of 5.5, an area-EGT ratio of 1.30, a first stage AN$^2$ value of 14, and a fifth stage AN$^2$ value of 76. FIG. 15 provides additional information about the LPT 1200 (see Engine 36).

FIG. 15 provides a table with several additional examples of turbomachinery engines comprising five rotating blade stages, a LPT with an area ratio within a range of 2.0-6.5 and an area-EGT ratio within a range of 1.3-1.6. The engines disclosed in FIG. 15 comprise a gear ratio of 2.0-9.0 or 6.96-7.56. The EGT at a redline operating condition for the engines of FIG. 15 is within a range of 1060-1175 degrees Celsius, and particularly 1175 degrees Celsius. The exit area of stage 1 of the disclosed engines is within a range of 155-380 in$^2$ or within a range of 155.4-232.6 in$^2$. The exit area of stage 2 of the engines of FIG. 15 is within a range of 230-750 in$^2$ or within a range of 250.2-341.6 in$^2$. The exit area of stage 3 of the engines of FIG. 15 is within a range of 350-1050 in$^2$ or within a range of 379.3-527.7 in$^2$. The exit area of stage 4 of the engines of FIG. 15 is within a range of 630-1200 in$^2$ or within a range of 563.1-895 in$^2$. The exit area of stage 5 of the engines of FIG. 15 is within a range of 800-1300 in$^2$, within a range of 851-1280 in$^2$, or within a range of 851.4-1279.3 in$^2$. The area ratio of the engines disclosed in FIG. 15 is within a range of 2.0-6.5 or within a range of 5.48-6.43. The area-EGT ratio is within a range of 1.3-1.6 or within a range of 1.30-1.36. The engines disclosed in FIG. 15 comprise a first stage AN$^2$ value within a range of 9-36 or within a range of 9-15 at a redline operating condition. The engines disclosed in FIG. 15 comprise a fifth stage (exit) AN$^2$ value within a range of 44-104 or within a range of 59-84 at a redline operating condition.

The low-pressure turbines disclosed herein comprising an area ratio within a range of 2.0-6.5 and an area-EGT ratio within a range of 1.3-1.6 provides one or more advantages over conventional low-pressure turbines. In some examples, the disclosed LPTs have up to +1.3% (e.g., +0.1% to +1.3%) LPT efficiency compared to conventional LPTs. In some examples, the disclosed LPTs enable reduced LPT stage count or reduced tip speeds, which provides weight and/or cost reduction, without an efficiency penalty. In some examples, the disclosed LPTs enable higher BPR engines without adding LPT stages. In some examples, the disclosed LPTs reduce turbine rear frame (TRF) loss by up to 0.3% dP/P$_1$ due to the reduced LPT exit Mach number. As used herein, "dP" is the change in fluid pressure across the TRF, and "P$_1$" is the fluid pressure prior to the TRF. Stated another way, dP/P$_1$ equals the fluid pressure after the TRF (P$_2$) minus the fluid pressure prior to the TRF (P$_1$) divided by P$_1$. Thus, dP/P$_1$ is the relative change of the fluid pressure across the TRF. In at least some instances, the LPT exit Mach number of the LPTs disclosed herein can be <0.48.

Figure 16:
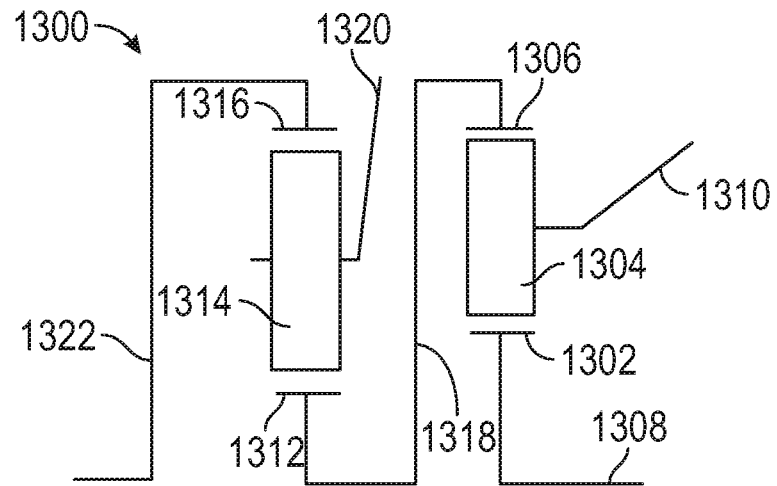
FIG. 16 is a cross-sectional schematic illustration of an example of a gearbox configuration for a turbomachinery engine, according to the present disclosure.

FIG. 16 schematically depicts a gearbox 1300 that can be used with the engines disclosed herein (e.g., the engines 100, 200, 300, and 400). The gearbox 1300 comprises a two-stage star configuration.

The first stage of the gearbox 1300 includes a first-stage sun gear 1302, a first-stage carrier 1304 housing a plurality of first-stage star gears, and a first-stage ring gear 1306. The first-stage sun gear 1302 can be coupled to a low-speed shaft 1308, which in turn is coupled to a low-pressure turbine. The first-stage sun gear 1302 can mesh with the plurality of first-stage star gears, which mesh with the first-stage ring gear 1306. The first-stage carrier 1304 can be fixed from rotation by a support member 1310.

The second stage of the gearbox 1300 includes a second-stage sun gear 1312, a second-stage carrier 1314 housing a plurality of second-stage star gears, and a second-stage ring gear 1316. The second-stage sun gear 1312 can be coupled to a shaft 1318 which in turn is coupled to the first-stage ring gear 1306. The second-stage carrier 1314 can be fixed from rotation by a support member 1320. The second-stage ring gear 1316 can be coupled to a fan shaft 1322.

In some examples, each stage of the gearbox 1300 can comprise five star gears. In other examples, the gearbox 1300 can comprise fewer or more than five star gears in each stage. In some examples, the first-stage carrier 1304 can comprise a different number of star gears than the second-stage carrier 1314. For example, the first-stage carrier 1304 can comprise five star gears, and the second-stage carrier 1314 can comprise three star gears, or vice versa.

Figure 17:
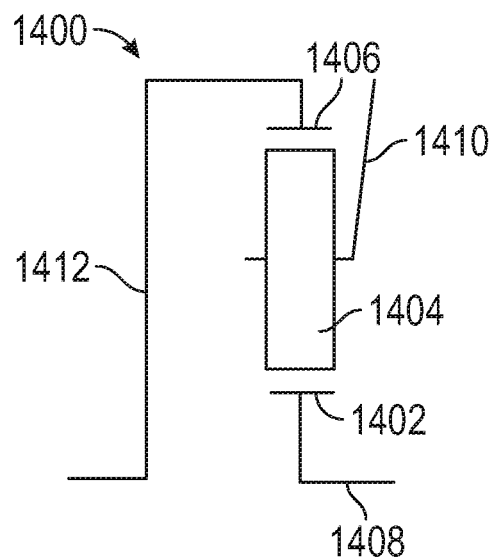
FIG. 17 is a cross-sectional schematic illustration of an example of a gearbox configuration for a turbomachinery engine, according to the present disclosure.

FIG. 17 schematically depicts a gearbox 1400 that can be used with the engines disclosed herein (e.g., the engines 100, 200, 300, and 400). The gearbox 1400 comprises a single-stage star configuration. The gearbox 1400 includes a sun gear 1402, a carrier 1404 housing a plurality of star gears (e.g., 3-5 star gears), and a ring gear 1406. The sun gear 1402 can mesh with the plurality of star gears, and the plurality of star gears can mesh with the ring gear 1406. The sun gear 1402 can be coupled to a low-speed shaft 1408, which in turn is coupled to the low-pressure turbine. The carrier 1404 can be fixed from rotation by a support member 1410. The ring gear 1406 can be coupled to a fan shaft 1412.

Figure 18:
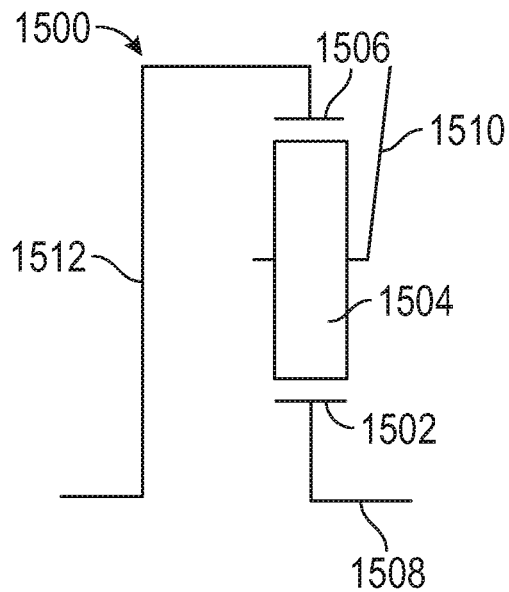
FIG. 18 is a cross-sectional schematic illustration of an example of a gearbox configuration for a turbomachinery engine, according to the present disclosure.

FIG. 18 schematically depicts a gearbox 1500 that can be used with the engines disclosed herein (e.g., the engines 100, 200, 300, and 400). The gearbox 1500 comprises a single-stage star configuration. The gearbox 1500 includes a sun gear 1502, a carrier 1504 housing a plurality of star gears (e.g., 3-5 star gears), and a ring gear 1506. The sun gear 1502 can mesh with the plurality of star gears, and the star gears can mesh with the ring gear 1506. The sun gear 1502 can be coupled to a low-speed shaft 1508, which in turn is coupled to the low-pressure turbine. The carrier 1504 can be fixed from rotation by a support member 1510. The ring gear 1506 can be coupled to a fan shaft 1512.

Figure 19:
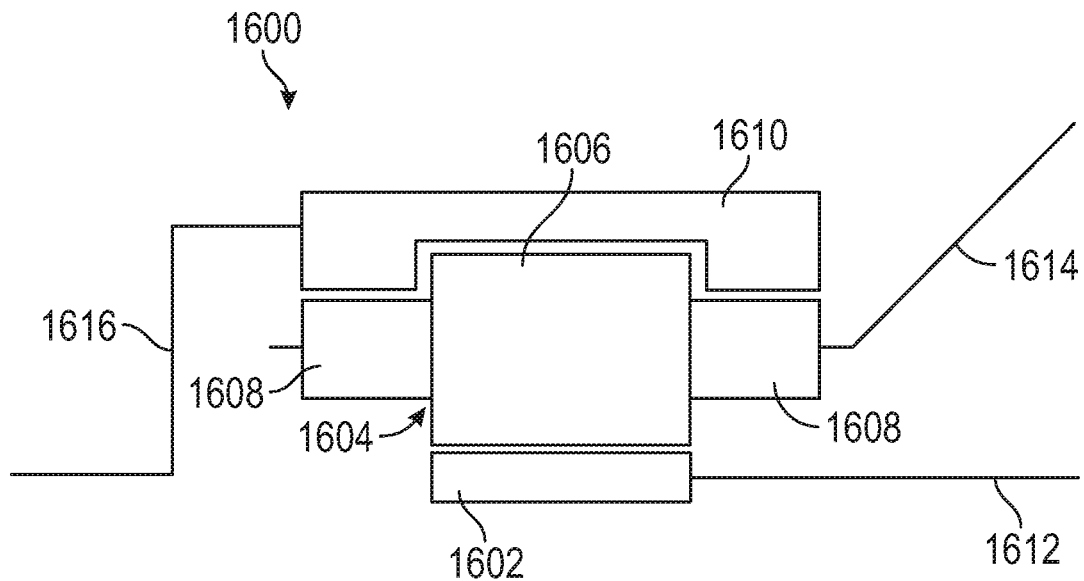
FIG. 19 is a cross-sectional schematic illustration of an example of a gearbox configuration for a turbomachinery engine, according to the present disclosure.

FIG. 19 depicts a gearbox 1600 that can be used, for example, with the engines disclosed herein (e.g., the engines 100, 200, 400). The gearbox 1600 is configured as a compound star gearbox. The gearbox 1600 comprises a sun gear 1602 and a star carrier 1604, which includes a plurality of compound star gears having one or more first portions 1606 and one or more second portions 1608. The gearbox 1600 further comprises a ring gear 1610. The sun gear 1602 can also mesh with the first portions 1606 of the plurality of compound star gears. The star carrier can be fixed from rotation via a support member 1614. The second portions 1608 of the plurality of compound star gears can mesh with the ring gear 1610. The sun gear 1602 can be coupled to a low-pressure turbine via the turbine shaft 1612. The ring gear 1610 can be coupled to a fan shaft 1616.

The gear assemblies shown and described herein can be used with any suitable engine. For example, although FIG. 4 shows an optional ducted fan and optional fan duct (similar to that shown in FIG. 2), it should be understood that such gear assemblies can be used with other ducted turbofan engines (e.g., the engine 300) and/or other open rotor engines that do not have one or more of such structures.

Configurations of the gear assemblies depicted and described herein may provide for gear ratios and arrangements that fit within the $L/D_{core}$ constraints of the disclosed engines. In certain examples, the gear assemblies depicted and described in regard to FIGS. 16-19 allow for gear ratios and arrangements providing for rotational speed of the fan assembly corresponding to one or more ranges of cruise altitude and/or cruise speed provided above.

Various configurations of the gear assembly provided herein may allow for gear ratios of up to 10:1. Still various examples of the gear assemblies provided herein may allow for gear ratios within a range of 2.5-4.0. Still yet various examples of the gear assemblies provided herein allow for gear ratios within a range of 4.1-10.0. Other examples can have a gear ratio within a range of 3.0-4.0. FIGS. 9, 12, and 15 also provide the gear ratio of several exemplary engines.

Various exemplary gear assemblies are shown and described herein, which can also be referred to as a gearbox. These gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachinery having a turbine and a shaft rotatable with the turbine. With such an engine, the rotating element (e.g., fan assembly 104) may be driven by the shaft (e.g., low-speed shaft) of the turbomachinery through the gear assembly.

Although the exemplary gear assemblies shown are mounted at a forward location (e.g., forward from the combustor and/or the low-pressure compressor), in other examples, the gear assemblies described herein can be mounted at an aft location (e.g., aft of the combustor and/or the low-pressure turbine).

Figure 20:
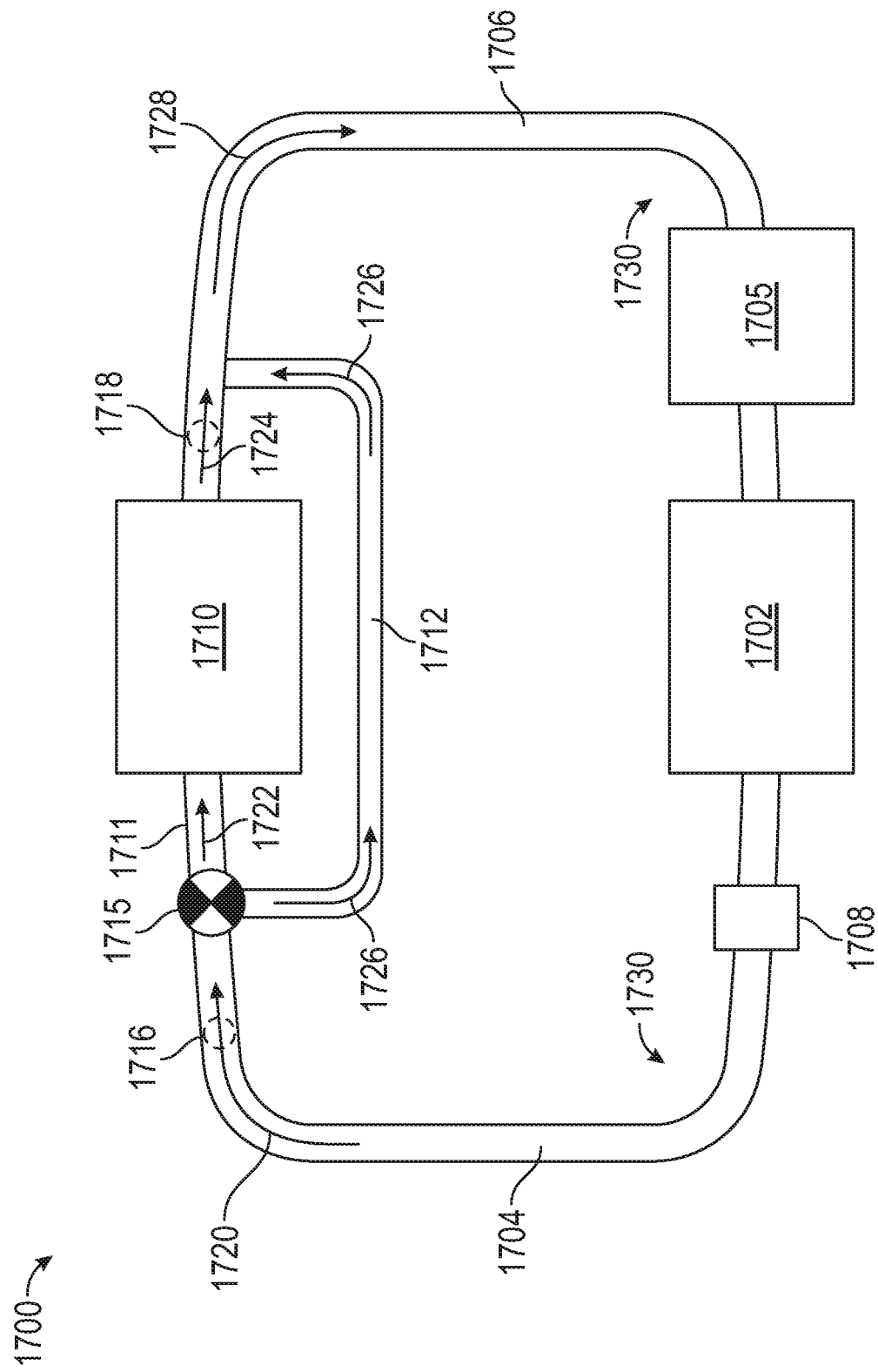
FIG. 20 is a schematic diagram of an exemplary lubricant system supplying lubricant to an engine component, according to the present disclosure.

Portions of a lubricant system 1700 are depicted schematically in FIG. 20. The lubrication system 1700 can be a component of the turbomachinery engines disclosed herein (e.g., the engines 100, 200, 300, and 400) and/or can be coupled to the various gearboxes disclosed herein. For example, FIG. 1 schematically illustrates the lubricant system coupled to the turbofan engine 100 and the gear assembly 102. FIG. 20 illustrates a series of lubricant conduits 1703 can interconnect multiple elements of the lubricant system 1700 and/or engine components, thereby providing for provision or circulation of the lubricant throughout the lubricant system and any engine components coupled thereto (e.g., a gearbox, bearing compartments, etc.).

It should be understood that the organization of the lubricant system 1700 as shown is by way of example only to illustrate an exemplary system for a turbomachinery engine for circulating lubricant for purposes such as lubrication or heat transfer. Any organization for the lubricant system 1700 is contemplated, with or without the elements as shown, and/or including additional elements interconnected by any necessary conduit system.

Referring still to FIG. 20, the lubricant system 1700 includes a lubricant reservoir 1702 configured to store a coolant or lubricant, including organic or mineral oils, synthetic oils, or fuel, or mixtures or combinations thereof. A supply line 1704 and a scavenge line 1706 are fluidly coupled to the reservoir 1702 and collectively form a lubricant circuit to which the reservoir 1702 and component 1710 (e.g., a gearbox) can be fluidly coupled. The component 1710 can be supplied with lubrication by way of a fluid coupling with the supply line 1704 and can return the supplied lubricant to the reservoir 1702 by fluidly coupling to the scavenge line 1706. More specifically, a component supply line 1711 can be fluidly coupled between the supply line 1704 and the component 1710. It is further contemplated that multiple types of lubricant can be provided in other lines not explicitly shown but are nonetheless included in the lubricant system 1700.

Optionally, at least one heat exchanger 1705 can be included in the lubricant system 1700. The heat exchanger 1705 can include a fuel/lubricant (fuel-to-lubricant) heat exchanger, an oil/lubricant heat exchanger, an air-cooled oil cooler, and/or other means for exchanging heat. For example, a fuel/lubricant heat exchanger can be used to heat or cool engine fuel with lubricant passing through the heat exchanger. In another example, a lubricant/oil heat exchanger can be used to heat or cool additional lubricants passing within the turbomachinery engine, fluidly separate from the lubricant passing along the lubricant system 1700. Such a lubricant/oil heat exchanger can also include a servo/lubricant heat exchanger. Optionally, a second heat exchanger (not shown) can be provided along the exterior of the core engine, downstream of the outlet guide vane assembly. The second heat exchanger can be an air/lubricant heat exchanger, for example, adapted to convectively cool lubricant in the lubricant system 1700 utilizing the airflow passing through an outlet guide vane assembly of the turbomachinery engine.

A pump 1708 can be provided in the lubricant system 1700 to aid in recirculating lubricant from the reservoir 1702 to the component 1710 via the supply line 1704. For example, the pump 1708 can be driven by a rotating component of the turbomachinery engine, such as a high-pressure shaft or a low-pressure shaft of a turbomachinery engine.

Lubricant can be recovered from the component 1710 by way of the scavenge line 1706 and returned to the reservoir 1702. In the illustrated example, the pump 1708 is illustrated along the supply line 1704 downstream of the reservoir 1702. The pump 1708 can be located in any suitable position within the lubricant system 1700, including along the scavenge line 1706 upstream of the reservoir 1702. In addition, while not shown, multiple pumps can be provided in the lubricant system 1700.

In some examples, a bypass line 1712 can be fluidly coupled to the supply line 1704 and scavenge line 1706 in a manner that bypasses the component 1710. In such examples, a bypass valve 1715 is fluidly coupled to the supply line 1704, component supply line 1711, and bypass line 1712. The bypass valve 1715 is configured to control a flow of lubricant through at least one of the component supply line 1711 or the bypass line 1712. The bypass valve 1715 can include any suitable valve including, but not limited to, a differential thermal valve, rotary valve, flow control valve, and/or pressure safety valve. In some examples, a plurality of bypass valves can be provided.

During operation, a supply flow 1720 can move from the reservoir 1702, through the supply line 1704, and to the bypass valve 1715. A component input flow 1722 can move from the bypass valve 1715 through the component supply line 1711 to an inlet of the component 1710. A scavenge flow 1724 can move lubricant from an outlet of the component 1710 through the scavenge line 1706 and back to the reservoir 1702. Optionally, a bypass flow 1726 can move from the bypass valve 1715 through the bypass line 1712 and to the scavenge line 1706. The bypass flow 1726 can mix with the scavenge flow 1724 and define a return flow 1728 moving toward the lubricant reservoir 1702.

In one example where no bypass flow exists, it is contemplated that the supply flow 1720 can be the same as the component input flow 1722 and that the scavenge flow 1724 can be the same as the return flow 1728. In another example where the bypass flow 1726 has a nonzero flow rate, the supply flow 1720 can be divided at the bypass valve 1715 into the component input flow 1722 and bypass flow 1726. It will also be understood that additional components, valves, sensors, or conduit lines can be provided in the lubricant system 1700, and that the example shown in FIG. 20 is simplified with a single component 1710 for purposes of illustration.

The lubricant system 1700 can further include at least one sensing position at which at least one lubricant parameter can be sensed or detected. The at least one lubricant parameter can include, but is not limited to, a flow rate, a temperature, a pressure, a viscosity, a chemical composition of the lubricant, or the like. In the illustrated example, a first sensing position 1716 is located in the supply line 1704 upstream of the component 1710, and a second sensing position 1718 is located in the scavenge line 1706 downstream of the component 1710.

In one example, the bypass valve 1715 can be in the form of a differential thermal valve configured to sense or detect at least one lubricant parameter in the form of a temperature of the lubricant. In such a case, the fluid coupling of the bypass valve 1715 to the first and second sensing positions 1716, 1718 can provide for bypass valve 1715 sensing or detecting the lubricant temperature at the sensing positions 1716, 1718 as lubricant flows to or from the bypass valve 1715. The bypass valve 1715 can be configured to control the component input flow 1722 or the bypass flow 1726 based on the sensed or detected temperature.

It is contemplated that the bypass valve 1715, supply line 1704, and bypass line 1712 can at least partially define a closed-loop control system for the component 1710. As used herein, a "closed-loop control system" will refer to a system having mechanical or electronic components that can automatically regulate, adjust, modify, or control a system variable without manual input or other human interaction. Such closed-loop control systems can include sensing components to sense or detect parameters related to the desired variable to be controlled, and the sensed or detected parameters can be utilized as feedback in a "closed loop" manner to change the system variable and alter the sensed or detected parameters back toward a target state. In the example of the lubricant system 1700, the bypass valve 1715 (e.g., mechanical or electrical component) can sense a parameter, such as a lubricant parameter (e.g., temperature), and automatically adjust a system variable, e.g., flow rate to either or both of the bypass line 1712 or component 1710, without need of additional or manual input. In one example, the bypass valve can be automatically adjustable or self-adjustable such as a thermal differential bypass valve. In another example, the bypass valve can be operated or actuated via a separate controller. It will be understood that a closed-loop control system as described herein can incorporate such a self-adjustable bypass valve or a controllable bypass valve.

Figure 21:
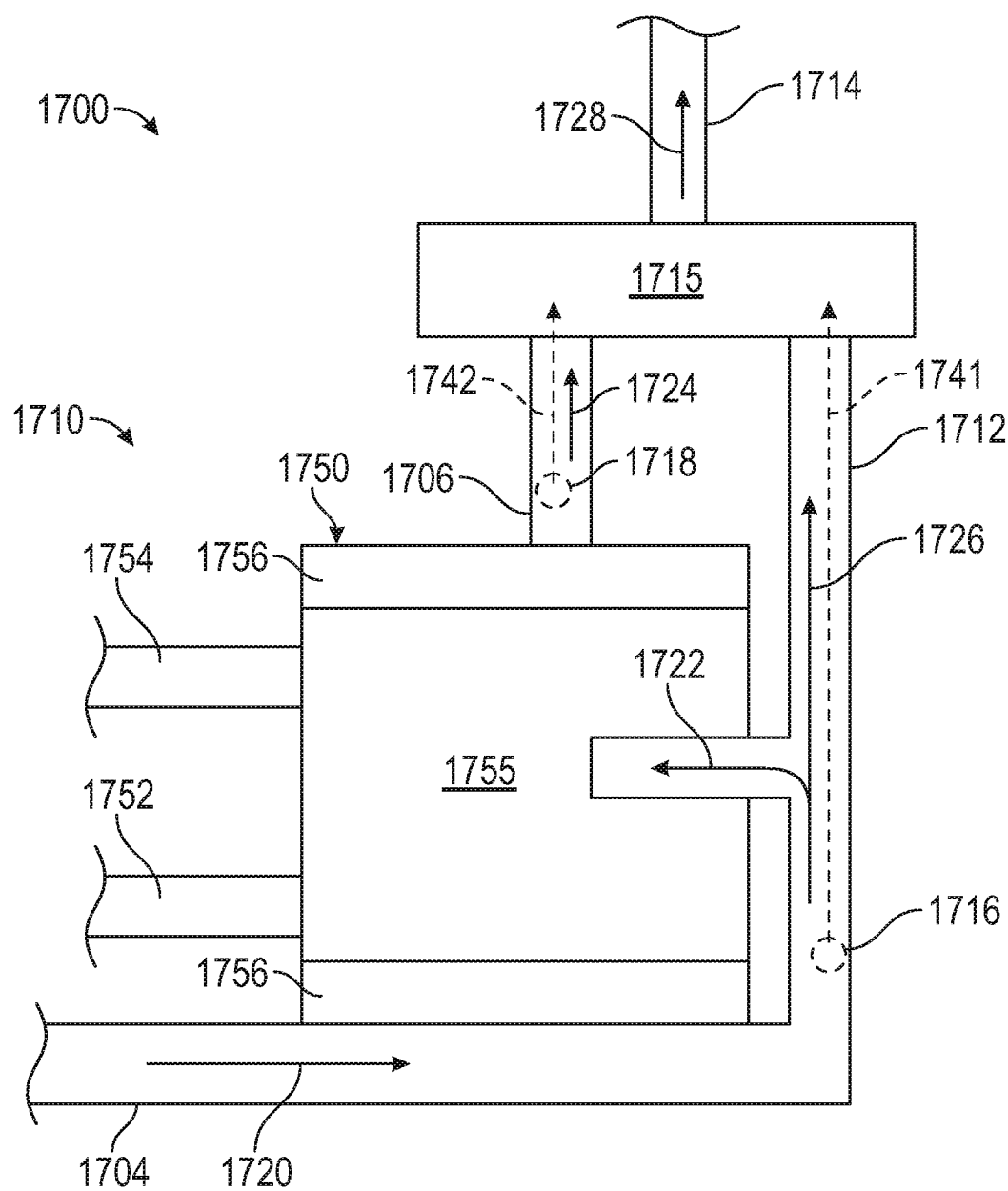
FIG. 21 is a schematic diagram of the lubricant system configured to supply lubricant to a gearbox, according to the present disclosure.

Turning to FIG. 21, a portion of the lubricant system 1700 is illustrated supplying lubricant to a particular component 1710 in the form of a gearbox 1750 within a turbomachinery engine. The gearbox can be any of the gearboxes disclosed herein. The gearbox 1750 can include an input shaft 1752, an output shaft 1754, and a gear assembly 1755. In one example, the gear assembly 1755 can be in the form of an epicyclic gear assembly as known in the art having a ring gear, sun gear, and at least one planet/star gear. An outer housing 1756 can at least partially surround the gear assembly 1755 and form a structural support for the gears and bearings therein. Either or both of the input and output shafts 1752, 1754 can be coupled to the turbomachinery engine. In one example, the input and output shafts 1752, 1754 can be utilized to decouple the speed of the low-pressure turbine from the low-pressure compressor and/or the fan, which can, for example, improve engine efficiency.

The supply line 1704 can be fluidly coupled to the gearbox 1750, such as to the gear assembly 1755, to supply lubricant to gears or bearings to the gearbox 1750 during operation. The scavenge line 1706 can be fluidly coupled to the gearbox 1750, such as to the gear assembly 1755 or outer housing 1756, to collect lubricant. The bypass line 1712 can be fluidly coupled to the bypass valve 1715, supply line 1704, and scavenge line 1706 as shown. A return line 1714 can also be fluidly coupled to the bypass valve 1715, such as for directing the return flow 1728 to the lubricant reservoir 1702 for recirculation. While not shown in FIG. 21 for brevity, the lubricant reservoir 1702, the heat exchanger 1705, and/or the pump 1708 (FIG. 20) can also be fluidly coupled to the gearbox 1750. In this manner, the supply line 1704, bypass line 1712, scavenge line 1706, and return line 1714 can at least partially define a recirculation line 1730 (FIG. 20) for the lubricant system 1700.

The supply flow 1720 divides at the bypass line into the component input flow 1722 and the bypass flow 1726. In the example shown, the bypass valve 1715 is in the form of a differential thermal valve that is fluidly coupled to the first and second sensing positions 1716, 1718.

Lubricant flowing proximate the first and second sensing positions 1716, 1718 provides the respective first and second outputs 1741, 1742 indicative of the temperature of the lubricant at those sensing positions 1716, 1718. It will be understood that the supply line 1704 is thermally coupled to the bypass line 1712 and bypass valve 1715 such that the temperature of the fluid in the supply line 1704 proximate the first sensing position 1716 is approximately the same as fluid in the bypass line 1712 adjacent the bypass valve 1715. Two values being "approximately the same" as used herein will refer to the two values not differing by more than a predetermined amount, such as by more than 20%, or by more than 5 degrees, in some examples. In this manner, the bypass valve 1715 can sense the lubricant temperature in the supply line 1704 and scavenge line 1706 via the first and second outputs 1741, 1742. It can be appreciated that the bypass line 1712 can form a sensing line for the valve 1715 to sense the lubricant parameter, such as temperature, at the first sensing position 1716.

During operation of the turbomachinery engine, the lubricant temperature can increase within the gearbox 1750, such as due to heat generation of the gearbox 1750, and throughout the lubricant system 1700. In one example, if a lubricant temperature exceeds a predetermined threshold temperature at either sensing position 1716, 1718, the bypass valve 1715 can automatically increase the component input flow 1722, e.g., from the supply line 1704 to the gearbox 1750, by decreasing the bypass flow 1726. Such a predetermined threshold temperature can be any suitable operating temperature for the gearbox 1750, such as about 300° F. in some examples. Increasing the component input flow 1722 can provide for cooling of the gearbox 1750, thereby reducing the lubricant temperature sensed in the various lines 1704, 1706, 1712, 1714 as lubricant recirculates through the lubricant system 1700.

In another example, if a temperature difference between the sensing positions 1716, 1718 exceeds a predetermined threshold temperature difference, the bypass valve 1715 can automatically increase the component input flow 1722 by decreasing the bypass flow 1726. Such a predetermined threshold temperature difference can be any suitable operating temperature for the gearbox 1750, such as about 70° F., or differing by more than 30%, in some examples. In yet another example, if a temperature difference between the sensing positions 1716, 1718 is below the predetermined threshold temperature difference, the bypass valve 1715 can automatically decrease the component input flow 1722 or increase the bypass flow 1726. In this manner the lubricant system 1700 can provide for the gearbox 1750 to operate with a constant temperature difference between the supply and scavenge lines 1704, 1706.

This written description uses examples to disclose the technology, including the best mode, and also to enable any person skilled in the art to practice the disclosed technology, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the disclosure are provided by the subject matter of the following clauses:

A turbomachinery engine comprising a fan assembly, a low-pressure turbine, and a gearbox. The fan assembly includes a plurality of fan blades. The low-pressure turbine comprises 3-5 rotating stages. Each rotating stage of the low-pressure turbine comprises an annular exit area defined by a tip radius of a trailing edge of any one blade of the rotating stage and a hub radius of the any one blade of the rotating stage at an axial location aligned with the tip radius. The low-pressure turbine comprises an area ratio equal to the annular exit area of an aft-most rotating stage of the low-pressure turbine divided by the annular exit area of a forward-most rotating stage of the low-pressure turbine, and the area ratio is within a range of 2.0-6.5. The gearbox includes an input and an output. The input of the gearbox is coupled to the low-pressure turbine and comprises a first rotational speed, and the output of the gearbox is coupled to the fan assembly and comprises a second rotational speed.

The turbomachinery engine of the preceding clause, wherein the area ratio of the low-pressure turbine is within a range of 2.0-3.2.

The turbomachinery engine of any preceding clause, wherein the area ratio of the low-pressure turbine is within a range of 2.2-4.6.

The turbomachinery engine of any preceding clause, wherein the low-pressure turbine includes exactly three rotating stages, and wherein the area ratio of the low-pressure turbine is within a range of 2.2-2.91.

The turbomachinery engine of any preceding clause, wherein the low-pressure turbine includes exactly four rotating stages, and wherein the area ratio of the low-pressure turbine is within a range of 3.1-5.1.

The turbomachinery engine of any preceding clause, wherein the low-pressure turbine includes exactly five rotating stages, and wherein the area ratio of the low-pressure turbine is within a range of 5.4-6.5.

The turbomachinery engine of any preceding clause, wherein the fan assembly is a ducted fan assembly disposed radially within a fan case.

The turbomachinery engine of any preceding clause, wherein the fan assembly is an unducted fan assembly.

The turbomachinery engine of any preceding clause, wherein the fan assembly comprises a first fan and a second fan, each comprising a plurality of fan blades, wherein the second fan is disposed aft of the first fan and has a smaller diameter than the first fan, and wherein the turbomachinery engine is a three-stream engine.

The turbomachinery engine of any preceding clause, wherein the low-pressure turbine comprises an $AN^2$ value within a range of 70-104, where A is the annular exit area of the aft-most rotating stage of the low-pressure turbine measured in square inches, N is the rotational speed of the low-pressure turbine measured in revolutions per minute at a redline operating condition, and the product of $AN^2$ is divided by $10^9$.

The turbomachinery of any preceding clause, wherein the low-pressure turbine further comprises an area-EGT ratio within a range of 1.3-1.6, wherein the $$\text{area-}EGT \text{ ratio} = \frac{(\text{the area ratio})^{(1/(LPT\ stages-1))}}{(EGT/1000)},$$

where the LPT stages is the number of rotating stages of the low-pressure turbine, and the EGT is an exhaust gas temperature of the low-pressure turbine measured in degrees Celsius at an inlet of the low-pressure turbine at a redline operating condition.

The turbomachinery engine of any preceding clause, wherein an/the exhaust gas temperature of the low-pressure turbine is within a range of 1060-1180 degrees Celsius measured at an/the inlet of the low-pressure turbine at a/the redline operating condition.

The turbomachinery engine of any preceding clause, wherein a gear ratio of the first rotational speed to the second rotational speed is within a range of 2.0-10.0.

The turbomachinery engine of any preceding clause, wherein a gear ratio of the first rotational speed to the second rotational speed is within a range of 2.5-10.0.

The turbomachinery engine of any preceding clause, wherein a gear ratio of the first rotational speed to the second rotational speed is within a range of 2.75-10.0.

The turbomachinery engine of any preceding clause, wherein a gear ratio of the first rotational speed to the second rotational speed is within a range of 2.0-6.0.

The turbomachinery engine of any preceding clause, wherein a gear ratio of the first rotational speed to the second rotational speed is within a range of 3.0-3.5.

Example 18. The turbomachinery engine of any preceding clause, wherein a gear ratio of the first rotational speed to the second rotational speed is within a range of 3.0-4.0.

The turbomachinery engine of any preceding clause, wherein a gear ratio of the first rotational speed to the second rotational speed is within a range of 6.0-10.0.

The turbomachinery engine of any preceding clause, wherein a gear ratio of the first rotational speed to the second rotational speed is within a range of 6.5-9.0.

A turbomachinery engine comprising a fan assembly, a low-pressure turbine, and a gearbox. The fan assembly includes a plurality of fan blades. The low-pressure turbine comprising 3-4 rotating stages. Each rotating stage of the low-pressure turbine comprises an annular exit area defined by a tip radius of a trailing edge of any one blade of the rotating stage and a hub radius of the any one blade of the rotating stage at an axial location aligned with the tip radius. The low-pressure turbine comprises an area ratio equal to the annular exit area of an aft-most rotating stage of the low-pressure turbine divided by the annular exit area of a forward-most rotating stage of the low-pressure turbine, and the area ratio is within a range of 2.1-4.6. The gearbox including an input and an output. The input of the gearbox is coupled to the low-pressure turbine and comprises a first rotational speed, the output of the gearbox is coupled to the fan assembly and has a second rotational speed, and a gear ratio of the first rotational speed to the second rotational speed is within a range of 3.0-3.5.

The turbomachinery engine of any preceding clause, wherein the area ratio of the low-pressure turbine is within a range of 2.2-3.2.

The turbomachinery engine of any preceding clause, wherein the low-pressure turbine includes exactly three rotating stages, and wherein the area ratio of the low-pressure turbine is within a range of 2.2-2.99.

The turbomachinery engine of any preceding clause, wherein the low-pressure turbine includes exactly four rotating stages, and wherein the area ratio of the low-pressure turbine is within a range of 2.3-4.59.

The turbomachinery engine of any preceding clause, wherein the fan assembly is a ducted fan assembly.

The turbomachinery engine of any preceding clause, wherein the ducted fan assembly comprises a first ducted fan and a second ducted fan, each comprising a plurality of fan blades, wherein the second ducted fan is disposed aft of the first ducted fan and has a smaller diameter than the first ducted fan, and wherein the turbomachinery engine is a three-stream engine.

The turbomachinery engine of any preceding clause, wherein the low-pressure turbine comprises an $AN^2$ value within a range of 70-104, where A the annular exit area of the aft-most rotating stage of the low-pressure turbine measured in square inches, N is the rotational speed of the low-pressure turbine measured in revolutions per minute at a redline operating condition, and a product of $AN^2$ is divided by $10^9$.

The turbomachinery of any preceding clause, wherein the low-pressure turbine further comprises an area-EGT ratio within a range of 1.3-1.6, wherein the $$\text{area-}EGT \text{ ratio} = \frac{(\text{the area ratio})^{(1/(LPT\ stages-1))}}{(EGT/1000)},$$

where the LPT stages is a number of rotating stages of the low-pressure turbine, and the EGT is an exhaust gas temperature of the low-pressure turbine measured in degrees Celsius at an inlet of the low-pressure turbine at a redline operating condition.

The turbomachinery engine of any preceding clause, wherein an/the exhaust gas temperature of the low-pressure turbine is within a range of 1060-1180 degrees Celsius measured at an/the inlet of the low-pressure turbine at a/the redline operating condition.

The turbomachinery engine of any preceding clause, wherein the fan assembly comprises 8-22 fan blades, and wherein the turbomachinery engine further comprises a low-pressure compressor comprising 1-8 stages, a high-pressure compressor comprising 8-11 stages, and a high-pressure turbine comprising 1-2 stages.

The turbomachinery engine of any preceding clause, wherein: the fan assembly comprises 12-18 fan blades; the low-pressure compressor comprises 3-5 stages; the high-pressure compressor comprises 8-9 stages; and the high-pressure turbine comprises 2 stages.

A turbomachinery engine comprising a fan assembly, a low-pressure turbine, and a gearbox. The fan assembly includes a plurality of fan blades. The low-pressure turbine comprises 4-5 rotating stages. Each rotating stage of the low-pressure turbine comprises an annular exit area defined by a tip radius of a trailing edge of any one blade of the rotating stage and a hub radius of the any one blade of the rotating stage at an axial location aligned with the tip radius. The low-pressure turbine comprises an area ratio equal to the annular exit area of an aft-most rotating stage of the low-pressure turbine divided by the annular exit area of a forward-most rotating stage of the low-pressure turbine, and the area ratio is within a range of 3.6-5.79. The gearbox includes an input and an output. The input of the gearbox is coupled to the low-pressure turbine and comprises a first rotational speed, the output of the gearbox is coupled to the fan assembly and has a second rotational speed, and a gear ratio of the first rotational speed to the second rotational speed is within a range of 5.0-10.0.

The turbomachinery engine of any preceding clause, wherein the gear ratio is within a range of 6.0-9.0.

The turbomachinery engine of any preceding clause, wherein the area ratio of the low-pressure turbine is within a range of 4.1-5.79.

The turbomachinery engine of any preceding clause, wherein the low-pressure turbine includes exactly four rotating stages.

The turbomachinery engine of any example herein, and particularly any one of examples 32-34, wherein the low-pressure turbine includes exactly five rotating stages.

The turbomachinery engine of any preceding clause, wherein the fan assembly is an unducted fan assembly.

The turbomachinery engine of any preceding clause, further comprising a ducted fan assembly disposed aft of the unducted fan assembly, and wherein the turbomachinery engine is a three-stream engine.

The turbomachinery engine of any preceding clause, wherein the low-pressure turbine comprises an $AN^2$ value within a range of 70-104, where A is the annular exit area of the aft-most rotating stage of the low-pressure turbine measured in square inches, N is the rotational speed of the low-pressure turbine measured in revolutions per minute at a redline operating condition, and a product of $AN^2$ is divided by $10^9$.

The turbomachinery of any preceding clause, wherein the low-pressure turbine further comprises an area-EGT ratio within a range of 1.3-1.6, wherein the $$\text{area-}EGT \text{ ratio} = \frac{(\text{the area ratio})^{(1/(LPT\ stages-1))}}{(EGT/1000)},$$

where the LPT stages is a number of rotating stages of the low-pressure turbine, and the EGT is an exhaust gas temperature of the low-pressure turbine measured in degrees Celsius at an inlet of the low-pressure turbine at a redline operating condition.

The turbomachinery engine of any preceding clause, wherein an/the exhaust gas temperature of the low-pressure turbine is within a range of 1060-1180 degrees Celsius measured at an/the inlet of the low-pressure turbine at a/the redline operating condition.

The turbomachinery engine of any preceding clause, wherein the fan assembly comprises 8-22 fan blades. The turbomachinery engine further comprises a low-pressure compressor comprising 1-5 stages, a high-pressure compressor comprising 7-11 stages, a high-pressure turbine comprising 1-2 stages.

The turbomachinery engine of any preceding clause, wherein: the fan assembly comprises 12-18 fan blades; the low-pressure compressor comprises 3-5 stages; the high-pressure compressor comprises 8-10 stages; and the high-pressure turbine comprises 2 stages.

A turbomachinery engine comprising a fan assembly, a low-pressure turbine, and a gearbox. The fan assembly including a plurality of fan blades. The low-pressure turbine comprises 3-5 rotating stages and an area-EGT ratio within a range of 1.3-1.6. The $$\text{area-}EGT \text{ ratio} = \frac{(\text{area ratio})^{(1/(LPT\ stages-1))}}{(EGT/1000)}.$$

Each rotating stage of the low-pressure turbine comprises an annular exit area defined by a tip radius of a trailing edge of any one blade of the rotating stage and a hub radius of the any one blade of the rotating stage at an axial location aligned with the tip radius. The area ratio is the annular exit area of an aft-most rotating stage of the low-pressure turbine divided by the annular exit area of a forward-most rotating stage of the low-pressure turbine. The LPT stages is the number of rotating stages of the low-pressure turbine. The EGT is an exhaust gas temperature of the low-pressure turbine measured in degrees Celsius at an inlet of the low-pressure turbine at a redline operating condition. The gearbox including an input and an output. The input of the gearbox is coupled to the low-pressure turbine and comprises a first rotational speed, and the output of the gearbox is coupled to the fan assembly and has a second rotational speed.

The turbomachinery engine of any preceding clause, wherein the area-EGT ratio is within a range of 1.38-1.58.

The turbomachinery engine of any preceding clause, wherein the area-EGT ratio is within a range of 1.31-1.53.

The turbomachinery engine of any preceding clause, wherein the area-EGT ratio is within a range of 1.30-1.36.

The turbomachinery engine of any preceding clause, wherein the area ratio of the low-pressure turbine is within a range of 2.2-4.6.

The turbomachinery engine of any preceding clause, wherein the low-pressure turbine includes exactly three rotating stages, and wherein the area ratio of the low-pressure turbine is within a range of 2.2-2.91.

The turbomachinery engine of any preceding clause, wherein the low-pressure turbine includes exactly four rotating stages, and wherein the area ratio of the low-pressure turbine is within a range of 3.0-5.2.

The turbomachinery engine of any preceding clause, wherein the low-pressure turbine includes exactly five rotating stages, and wherein the area ratio of the low-pressure turbine is within a range of 5.0-6.5.

The turbomachinery engine of any preceding clause, wherein the fan assembly is a ducted fan assembly disposed radially within a fan case.

The turbomachinery engine of any preceding clause, wherein the fan assembly is an unducted fan assembly.

The turbomachinery engine of any preceding clause, wherein the fan assembly comprises a first fan and a second fan, each comprising a plurality of fan blades, wherein the second fan is disposed aft of the first fan and has a smaller diameter than the first fan, and wherein the turbomachinery engine is a three-stream engine.

The turbomachinery engine of any preceding clause, wherein the low-pressure turbine comprises an $AN^2$ value within a range of 70-104, where A is the annular exit area of the aft-most rotating stage of the low-pressure turbine measured in square inches, N is the rotational speed of the low-pressure turbine measured in revolutions per minute at a redline operating condition, and a product of $AN^2$ is divided by $10^9$.

The turbomachinery engine of any preceding clause, wherein the exhaust gas temperature of the low-pressure turbine is within a range of 1060-1180 degrees Celsius measured at the inlet of the low-pressure turbine at the redline operating condition.

The turbomachinery engine of any preceding clause, wherein a gear ratio of the first rotational speed to the second rotational speed is within a range of 2.0-10.0.

The turbomachinery engine of any preceding clause, wherein a gear ratio of the first rotational speed to the second rotational speed is within a range of 2.5-10.0.

The turbomachinery engine of any preceding clause, wherein a gear ratio of the first rotational speed to the second rotational speed is within a range of 2.75-10.0.

The turbomachinery engine of any preceding clause, wherein a gear ratio of the first rotational speed to the second rotational speed is within a range of 2.75-3.5.

The turbomachinery engine of any preceding clause, wherein a gear ratio of the first rotational speed to the second rotational speed is within a range of 3.0-4.0.

The turbomachinery engine of any preceding clause, wherein a gear ratio of the first rotational speed to the second rotational speed is within a range of 4.1-10.0.

The turbomachinery engine of any preceding clause, wherein a gear ratio of the first rotational speed to the second rotational speed is within a range of 6.0-10.0.

The turbomachinery engine of any preceding clause, wherein a gear ratio of the first rotational speed to the second rotational speed is within a range of 6.5-9.0.

A turbine for an aircraft engine comprising 3-5 rotating stages and an area ratio within a range of 2.0-6.5. Each rotating stage comprises an annular exit area defined by a tip radius of a trailing edge of any one blade of the rotating stage and a hub radius of the any one blade of the rotating stage at an axial location aligned with the tip radius. The area ratio equals the annular exit area of an aft-most rotating stage divided by the annular exit area of a forward-most rotating stage.

The turbine of any preceding clause, wherein the turbine is a low-pressure turbine disposed aft of a high-pressure turbine.

A turbine for an aircraft engine comprising 3-5 rotating stages and an area-EGT ratio within a range of 1.3-1.6. The $$\text{area-}EGT \text{ ratio} = \frac{(\text{area ratio})^{(1/(LPT\ stages-1))}}{(EGT/1000)}.$$

Each rotating stage comprises an annular exit area defined by a tip radius of a trailing edge of any one blade of the rotating stage and a hub radius of the any one blade of the rotating stage at an axial location aligned with the tip radius. The area ratio is the annular exit area of an aft-most rotating stage divided by the annular exit area of a forward-most rotating stage, wherein the stages is the number of rotating stages. The EGT is an exhaust gas temperature measured in degrees Celsius at an inlet of the turbine at a redline operating condition.

The turbine of any preceding clause, wherein the turbine is a low-pressure turbine disposed aft of a high-pressure turbine.

The invention claimed is:

1. A turbomachinery engine comprising:
    a fan case;
    a ducted fan assembly including a plurality of fan blades disposed within the fan case;
    a low-pressure compressor;
    a high-pressure compressor;
    a combustor;
    a high-pressure turbine;
    a low-pressure turbine comprising 3-4 rotating stages, wherein each rotating stage of the low-pressure turbine comprises an annular exit area defined by a tip radius of a trailing edge of any one blade of the rotating stage and a hub radius of the any one blade of the rotating stage at an axial location aligned with the tip radius, wherein the low-pressure turbine comprises an area ratio equal to the annular exit area of an aft-most rotating stage of the low-pressure turbine divided by the annular exit area of a forward-most rotating stage of the low-pressure turbine, and wherein the area ratio is within a range of 3.1-5.1; and
    a gearbox including an input and an output, wherein the input of the gearbox is coupled to the low-pressure turbine and comprises a first rotational speed, and wherein the output of the gearbox is coupled to the fan assembly and comprises a second rotational speed, which is less than the first rotational speed.

2. The turbomachinery engine of claim 1, wherein the gearbox comprises a gear ratio of the first rotational speed to the second rotational speed that is within a range of 2.0-10.0.

3. The turbomachinery engine of claim 1, wherein the gearbox comprises a gear ratio of the first rotational speed to the second rotational speed that is within a range of 2.75-3.5.

4. The turbomachinery engine of claim 1, wherein the gearbox comprises a gear ratio of the first rotational speed to the second rotational speed that is within a range of 3.0-4.0.

5. The turbomachinery engine of claim 1, wherein the gearbox comprises a gear ratio of the first rotational speed to the second rotational speed that is within a range of 6.0-10.0.

6. The turbomachinery engine of claim 1, wherein the fan assembly comprises 8-22 fan blades.

7. The turbomachinery engine of claim 1, wherein the low-pressure compressor comprises 1-8 stages.

8. The turbomachinery engine of claim 1, wherein the high-pressure compressor comprises 8-11 stages.

9. The turbomachinery engine of claim 1, wherein the high-pressure turbine comprises 1-2 stages.

10. A turbomachinery engine comprising:
    a nacelle;

a ducted fan assembly comprising 12-18 fan blades disposed within the nacelle;
a low-pressure compressor comprising 3-5 stages;
a high-pressure compressor comprising 8-9 stages;
a combustor;
a high-pressure turbine comprising 2 stages;
a low-pressure turbine comprising 3-5 rotating stages, wherein each rotating stage of the low-pressure turbine comprises an annular exit area defined by a tip radius of a trailing edge of any one blade of the rotating stage and a hub radius of the any one blade of the rotating stage at an axial location aligned with the tip radius, wherein the low-pressure turbine comprises an area ratio equal to the annular exit area of an aft-most rotating stage of the low-pressure turbine divided by the annular exit area of a forward-most rotating stage of the low-pressure turbine, and wherein the area ratio is within a range of 3.1-5.1; and
a gearbox including an input and an output, wherein the input of the gearbox is coupled to the low-pressure turbine and comprises a first rotational speed, and wherein the output of the gearbox is coupled to the fan assembly and comprises a second rotational speed, which is less than the first rotational speed.

11. The turbomachinery engine of claim 10, wherein the gearbox comprises a gear ratio of the first rotational speed to the second rotational speed that is within a range of 2.0-10.0.

12. The turbomachinery engine of claim 10, wherein the gearbox comprises a gear ratio of the first rotational speed to the second rotational speed that is within a range of 2.75-3.5.

13. The turbomachinery engine of claim 10, wherein the gearbox comprises a gear ratio of the first rotational speed to the second rotational speed that is within a range of 3.0-4.0.

14. The turbomachinery engine of claim 10, wherein the gearbox comprises a gear ratio of the first rotational speed to the second rotational speed that is within a range of 6.0-10.0.

15. A turbomachinery engine comprising:
a fan case;
a ducted fan assembly comprising 8-22 fan blades disposed within the fan case;
a low-pressure compressor comprising 1-8 stages;
a high-pressure compressor comprising 8-11 stages;
a combustor;
a high-pressure turbine comprising 1-2 stages;
a low-pressure turbine comprising 3-4 rotating stages, wherein each rotating stage of the low-pressure turbine comprises an annular exit area defined by a tip radius of a trailing edge of any one blade of the rotating stage and a hub radius of the any one blade of the rotating stage at an axial location aligned with the tip radius, wherein the low-pressure turbine comprises an area ratio equal to the annular exit area of an aft-most rotating stage of the low-pressure turbine divided by the annular exit area of a forward-most rotating stage of the low-pressure turbine, and wherein the area ratio is within a range of 3.1-5.1; and
a gearbox including an input and an output, wherein the input of the gearbox is coupled to the low-pressure turbine and comprises a first rotational speed, and wherein the output of the gearbox is coupled to the fan assembly and comprises a second rotational speed, which is less than the first rotational speed.

16. The turbomachinery engine of claim 15, wherein the gearbox comprises a gear ratio of the first rotational speed to the second rotational speed that is within a range of 2.75-3.5.

17. The turbomachinery engine of claim 15, wherein the gearbox comprises a gear ratio of the first rotational speed to the second rotational speed that is within a range of 3.0-4.0.

18. The turbomachinery engine of claim 15, wherein the gearbox comprises a gear ratio of the first rotational speed to the second rotational speed that is within a range of 6.0-10.0.

19. The turbomachinery engine of claim 15, wherein:
the fan assembly comprises 14-18 fan blades;
the low-pressure compressor comprises 3-5 stages;
the high-pressure compressor comprises 8-10 stages; and
the high-pressure turbine comprises 2 stages.

20. A turbomachinery engine comprising:
a nacelle;
a ducted fan assembly comprising 12-18 fan blades disposed within the nacelle;
a low-pressure compressor comprising 1-8 stages;
a high-pressure compressor comprising 8-9 stages;
a combustor;
a high-pressure turbine comprising 1-2 stages;
a low-pressure turbine comprising 3-5 rotating stages, wherein each rotating stage of the low-pressure turbine comprises an annular exit area defined by a tip radius of a trailing edge of any one blade of the rotating stage and a hub radius of the any one blade of the rotating stage at an axial location aligned with the tip radius, wherein the low-pressure turbine comprises an area ratio equal to the annular exit area of an aft-most rotating stage of the low-pressure turbine divided by the annular exit area of a forward-most rotating stage of the low-pressure turbine, and wherein the area ratio is within a range of 3.1-5.1; and
a gearbox including an input and an output, wherein the input of the gearbox is coupled to the low-pressure turbine and comprises a first rotational speed, wherein the output of the gearbox is coupled to the fan assembly and comprises a second rotational speed, which is less than the first rotational speed.

* * * * *